US011283273B2

(12) United States Patent
Smith et al.

(10) Patent No.: US 11,283,273 B2
(45) Date of Patent: Mar. 22, 2022

(54) ALL-ELECTRIC MOBILE POWER UNIT WITH VARIABLE OUTPUTS

(71) Applicant: MOXION POWER CO., Mill Valley, CA (US)

(72) Inventors: Alexander J. Smith, Lakeside, CA (US); Paul M. Huelskamp, Mill Valley, CA (US); Alexander M. Meek, San Francisco, CA (US); Jared T. Mickle, Sausalito, CA (US)

(73) Assignee: MOXION POWER CO., Mill Valley, CA (US)

( * ) Notice: Subject to any disclaimer, the term of this patent is extended or adjusted under 35 U.S.C. 154(b) by 0 days.

(21) Appl. No.: 17/336,142

(22) Filed: Jun. 1, 2021

(65) Prior Publication Data

US 2021/0376634 A1 Dec. 2, 2021

Related U.S. Application Data

(60) Provisional application No. 63/033,120, filed on Jun. 1, 2020.

(51) Int. Cl.
*H02J 7/00* (2006.01)
*H02M 7/48* (2007.01)
*H02J 7/34* (2006.01)
*H02J 7/14* (2006.01)
*H02M 7/44* (2006.01)

(52) U.S. Cl.
CPC .......... *H02J 7/0042* (2013.01); *H02J 7/0044* (2013.01); *H02J 7/14* (2013.01); *H02J 7/342* (2020.01); *H02M 7/44* (2013.01); *H02M 7/48* (2013.01)

(58) Field of Classification Search
CPC ...................................................... H02J 7/0042
USPC ........................................................ 320/107
See application file for complete search history.

(56) References Cited

U.S. PATENT DOCUMENTS

| 5,148,357 | A | * | 9/1992 | Paice | ...................... H01F 30/12 363/126 |
| 7,795,837 | B1 | * | 9/2010 | Haun | .................. H01M 10/441 320/101 |
| 2007/0253181 | A1 | | 11/2007 | Bersiek | |
| 2009/0079161 | A1 | * | 3/2009 | Muchow | ................... F03D 9/32 280/400 |
| 2012/0026763 | A1 | | 2/2012 | Humphrey et al. | |
| 2013/0187464 | A1 | * | 7/2013 | Smith | ..................... F24S 80/40 307/47 |
| 2013/0188403 | A1 | | 7/2013 | Nielsen | |
| 2014/0324235 | A1 | | 10/2014 | Miller | |
| 2015/0129021 | A1 | | 5/2015 | Cinnamon et al. | |
| 2015/0214700 | A1 | | 7/2015 | Bergeron et al. | |
| 2016/0214493 | A1 | | 7/2016 | Herke et al. | |
| 2017/0085091 | A1 | | 3/2017 | Kamasaladan et al. | |

(Continued)

*Primary Examiner* — Jerry D Robbins
(74) *Attorney, Agent, or Firm* — Shay Glenn LLP

(57) ABSTRACT

An all-electric, battery powered industrial or commercial mobile power unit is provided that can include a number of features. The mobile power unit can include a DC electrical energy source configured to produce a voltage of approximately 300-450 VDC. The mobile power unit can be configured so as to produce a user programmable voltage output and/or a user selected voltage output of either 480 VAC 3-phase, 208 VAC 3-phase, or 240 VAC single-phase. The various output configurations are controlled by software with a system controller of the mobile power unit. Methods of use are also provided.

35 Claims, 16 Drawing Sheets

(56) References Cited

U.S. PATENT DOCUMENTS

2019/0013766 A1\* 1/2019 Stach .................. H02J 7/35
2019/0089241 A1   3/2019 Opila
2020/0144957 A1\* 5/2020 Petrella ............... H02J 3/383
2021/0028646 A1\* 1/2021 Heilman .............. H02J 9/062

\* cited by examiner

ALL-ELECTRIC MOBILE POWER UNIT WITH VARIABLE OUTPUTS

CROSS REFERENCE TO RELATED APPLICATIONS

This application claims the benefit of priority of U.S. Provisional Application No. 63/033,120, filed Jun. 1, 2020, which is herein incorporated by reference in its entirety.

INCORPORATION BY REFERENCE

All publications and patent applications mentioned in this specification are herein incorporated by reference to the same extent as if each individual publication or patent application was specifically and individually indicated to be incorporated by reference.

FIELD

The present application relates generally to industrial power generators which provide temporary power to industries such as construction, film, entertainment, power and utility, electric vehicles, and telecom. More specifically, this disclosure provides a novel all-electric industrial mobile power unit with a variety of features and methods of use.

BACKGROUND

Temporary electrical power systems are typically used in scenarios in which access to the electrical grid does not exist at a particular site or when the existing electrical grid does not satisfy the power requirements of the site. Examples include construction sites, mining sites, manufacturing sites, shipping locations, areas impacted by natural disasters, temporary event locations, electric vehicle charging, and others (e.g., such as military installations, telecom sites, and residential locations).

Traditional temporary electrical power systems comprise large industrial gas or diesel generators that are typically trailer or skid mounted and delivered to the site in need of additional electrical power. Diesel and gas generators, which are powered by combustion engines, are noisy, expensive to maintain, and emit pollutants, such as carbon dioxide, which necessitates outdoor operation or substantial ventilation. Additionally, fuel levels must be monitored and when refueling is required, the generator must either be towed to a refueling station or on-site refueling must be arranged.

There are a variety of load profiles that can be found on temporary power sites, and as a result, large diesel and gas generators come in different sizes (measured by the amount of power that can be generated continuously). The typical voltage outputs in North America are 480 VAC 3-Phase, 208 VAC 3-Phase, 240 VAC 1-Phase, and 120 VAC 1-Phase. Larger gas or diesel generators typically have a voltage selector switch for the user to set the desired electrical output. This voltage selector switch physically re-configures the poles on the alternator to form the desired output. Because multiple types of outputs are used with multiple electrical connections, it is sometimes not desirable to have all connection points on the generator active, and therefore the common practice is to utilize circuit breakers to enable/disable outlets as desired.

Traditional combustion temporary electrical power systems have a number of disadvantages including emissions, noise levels, operating costs, maintenance costs, significantly reduced power conversion efficiencies at low loads, and expensive refueling. Diesel generators typically do not have the response capability to keep total harmonic distortion (THD) within allowable limits for high demand applications like tower cranes. Additionally, diesel generators for high demand applications need a substantial resistor bank in order to not overspeed the engine. There exists a need for improved temporary electrical power systems that provide lower/zero emissions, near-silent operation, indoor operation, increased load flexibility, reduced maintenance requirements, and lower fuel costs.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

SUMMARY OF THE DISCLOSURE

Figure 1A:
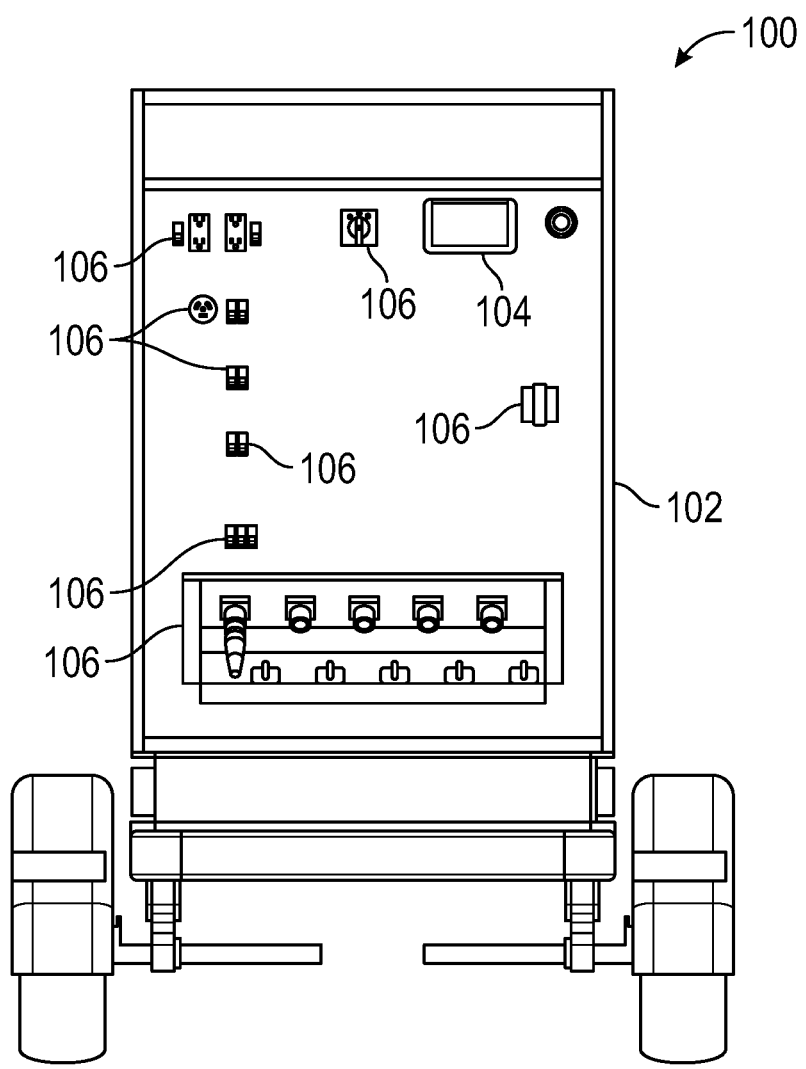
FIGS. 1A-1D illustrate various views of one embodiment of an all-electric, battery-powered industrial generator.

An all-electric, battery powered mobile power unit is provided, comprising a DC electrical energy source, a power conversion system coupled to the DC electrical energy source, and an electronic controller configured to control operation of the power conversion system to produce a user-selected voltage output ranging from 100 VAC up to 500 VAC and a user-selected phase configuration.

In some embodiments, the power conversion system comprises a high voltage DC/DC converter electrically coupled to the electrical energy source, and a plurality of inverter stages electrically coupled to the high voltage DC/DC converter.

In one embodiment, the user-selected voltage output and phase configuration is selected from the group consisting of 480 VAC 3-phase, 208 VAC 3-phase, and 240 VAC single-phase.

In some embodiments, the user-selected phase configuration is selected from the group consisting of single-phase and 3-phase.

In one example, when the user-selected voltage output and phase configuration comprises 480 VAC 3-phase, the electronic controller is configured to control the high voltage DC/DC converter(s) to operate as a boost converter in which a primary battery voltage from the electrical energy source is increased to a secondary voltage, and control the plurality of inverter stages to 277 VAC each and phase shift the outputs of the plurality of inverter stages to be 120 degrees apart.

In one example, the primary battery voltage from the electrical energy source comprises 300-450 VDC and the secondary voltage comprises 800 VDC.

In one embodiment, a neutral line corresponding to a first output of a first of the plurality of inverter stages is in phase with a line L1 corresponding to a second output of a second of the plurality of inverter stages, a line L2 corresponding to a third output of a third of the plurality of inverter stages is phase shifted by 120 degrees from the line L1, and a line L3 corresponding to a fourth output of a fourth of the plurality of inverter stages is phase shifted by 120 degrees from the line L2.

The electronic controller can be configured to provide the 480 VAC 3-phase output to only a subset of electrical connections on an interface panel of the mobile power unit. In some examples, the electronic controller is configured to provide the 480 VAC 3-phase output to only one or more tapered nose cam lock connectors or one or more threaded fastener style connectors on the interface panel of the mobile power unit. In another example, the electronic controller is configured to trigger circuit breakers associated with duplex connectors or CS6365 connectors on the interface panel of the mobile power unit to prevent the 480 VAC 3-phase output from reaching the duplex connectors or CS6365 connectors.

In another implementation, when the user-selected voltage output and phase configuration comprises 208 VAC 3-phase, the electronic controller is configured to control the high voltage DC/DC converter to operate as a pass-through, in which a primary battery voltage from the electrical energy source is provided as a secondary voltage, and control the plurality of inverter stages to phase shift the outputs of the plurality of inverter stages to be 120 degrees apart.

In one embodiment, the primary battery voltage from the electrical energy source comprises 300-450 VDC and the secondary voltage also comprises 300-450 VDC.

In one implementation, a neutral line corresponding to a first output of a first of the plurality of inverter stages is in phase with a line L1 corresponding to a second output of a second of the plurality of inverter stages, a line L2 corresponding to a third output of a third of the plurality of inverter stages is phase shifted by 120 degrees from the line L1, and a line L3 corresponding to a fourth output of a fourth of the plurality of inverter stages is phase shifted by 120 degrees from the line L2.

In one example, the electronic controller is configured to provide the 208 VAC 3-phase output to only a subset of electrical connections on an interface panel of the mobile power unit. The electronic controller can be configured to provide the 208 VAC 3-phase output to only one or more tapered nose cam lock connectors, one or more threaded fastener style connectors, or one or more duplex connectors on the interface panel of the mobile power unit. In one example, the electronic controller can be configured to trigger circuit breakers associated with CS6365 connectors on the interface panel of the mobile power unit to prevent the 208 VAC 3-phase output from reaching the CS6365 connectors.

In another implementation, when the user-selected voltage output and phase configuration comprises 240 VAC single-phase, the electronic controller is configured to control the high voltage DC/DC converter to operate as a pass-through, in which a primary battery voltage from the electrical energy source is provided as a secondary voltage, and control the plurality of inverter stages to phase shift first and second outputs of the plurality of inverter stages to be 180 degrees apart.

In one example, the primary battery voltage from the electrical energy source comprises 300-450 VDC and the secondary voltage also comprises 300-450 VDC.

In another implementation, a neutral line corresponding to a first output of a first of the plurality of inverter stages is in phase with a line L1 corresponding to a second output of a second of the plurality of inverter stages, and is in phase with a line L3 corresponding to a third output of a third of the plurality of inverter stages, a line L2 corresponding to a fourth output of a fourth of the plurality of inverter stages is phase shifted by 180 degrees from the neutral line, the line L1, and the line L3.

In one embodiment, the electronic controller is configured to provide the 240 VAC single-phase output to only a subset of electrical connections on an interface panel of the mobile power unit. In one example, the electronic controller is configured to provide the 240 VAC single-phase output to only one or more duplex connectors or one or more CS6365 connectors on the interface panel of the mobile power unit. In another example, the electronic controller is configured to trigger circuit breakers associated with tapered nose cam lock connectors or the threaded fastener style connectors on the interface panel of the mobile power unit to prevent the 240 VAC single-phase output from reaching the tapered nose cam lock connectors or the threaded fastener style connectors.

A method of delivering a user-selected voltage output with an all-electric, battery powered industrial mobile power unit is provided, comprising the steps of receiving a desired voltage output ranging from 100V AC up to 500V AC and a desired phase configuration from a user, controlling operation of a power conversion system of the mobile power unit with an electronic controller of the mobile power unit to produce the desired voltage output and phase configuration.

In one embodiment, controlling operation of the power conversion system further comprises controlling operation of a high voltage DC/DC converter and a plurality of inverter stages of the mobile power unit with the electronic controller.

In another embodiment, the desired voltage output and phase configuration is selected from the group consisting of 480 VAC 3-phase, 208 VAC 3-phase, and 240 VAC single-phase.

In some embodiments, the desired voltage output is between 100 VAC and 500 VAC.

In other embodiments, the desired voltage output and the desired phase configuration is provided to an appropriate subset of electrical connections on an interface panel of the mobile power unit.

DETAILED DESCRIPTION

The present disclosure describes all-electric, battery-powered industrial or commercial grade mobile power units configured to supply a variety of user-selected power outputs, including a user programmable output, 480V 3-phase outputs, 208V 3-phase outputs, 240V single-phase outputs, and/or a regulated DC output. In some embodiments, the mobile power unit can be configured to provide any customized or user-selected electrical output, including user selected voltage amplitudes, frequencies, phase shifts, or the like. The battery-powered mobile power units of the present disclosure are configured to be transported to a temporary power site to provide multiple power output options depending on the specific need.

The industrial mobile power units described herein generally include electrical energy sources with DC output voltages and energy storage capabilities that far exceed those found in consumer level battery packs and portable energy devices. These consumer devices are generally intended for charging consumer electronic devices like smartphones, tablets, and laptop computers, and typically provide a variety of standard 110V single phase outputs and/or USB charging outputs with energy storage options of up to around 2 kWh. In contrast, the industrial mobile power units of the present disclosure provide electrical energy sources with DC output voltages of up to 1000V DC, energy storage capabilities of up to or exceeding 600 kWh, 750 kWh, or greater, with a plurality of user selectable voltage output and phase configurations including a user programmable output, 480V 3-phase outputs, 208V 3-phase outputs, 240V single-phase outputs, and/or a regulated DC output. The industrial mobile power units of the present disclosure provide the user-selected or user-programmed voltage output and phase configurations without using inefficient, expensive, and bulky current and voltage transformers.

Figure 1B:
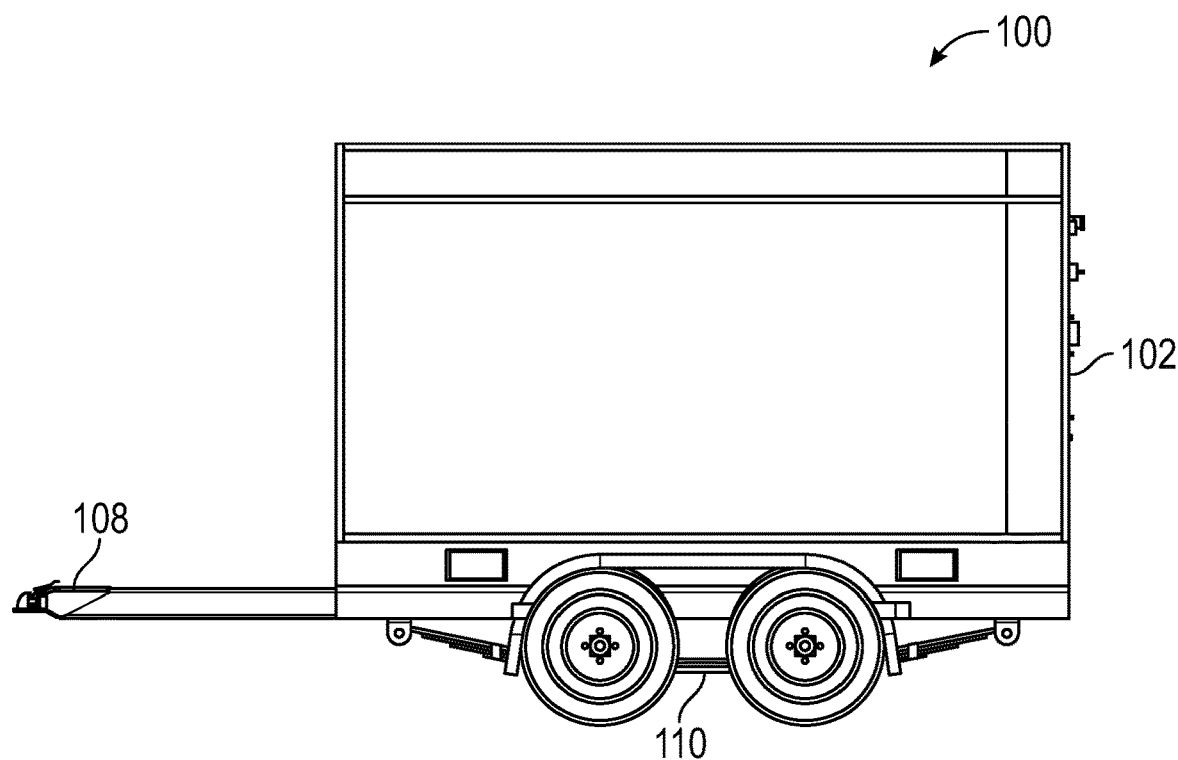
Figure 1C:
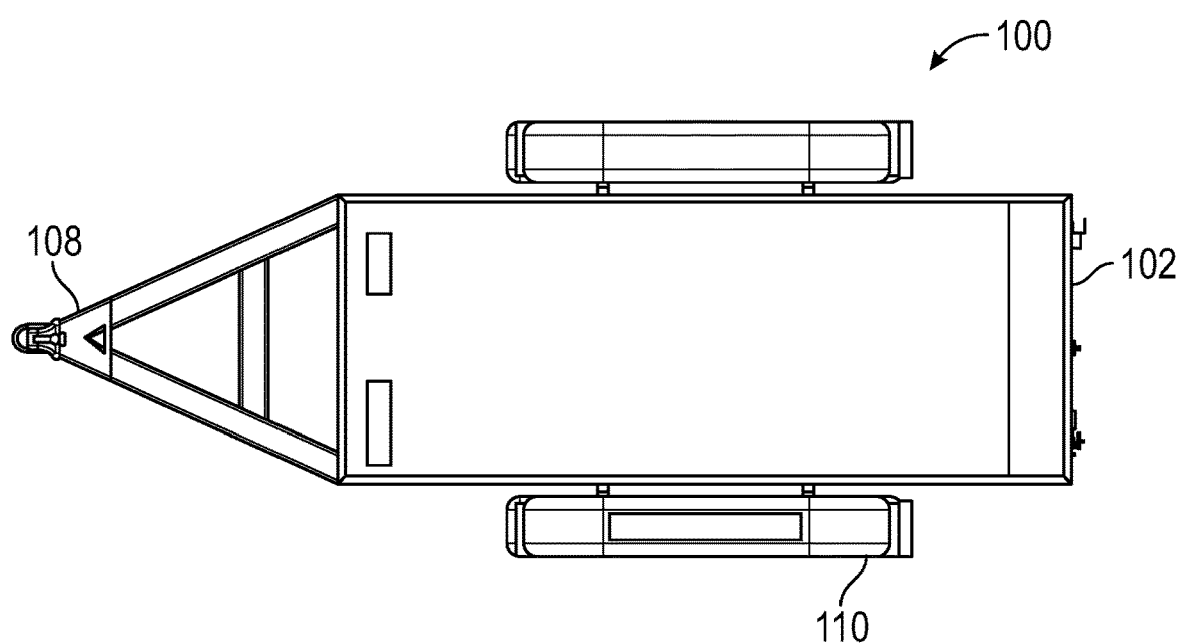

FIGS. 1A-1C are various views of one embodiment of an all-electric mobile power unit 100. FIG. 1A illustrates a rear-view of the all-electric mobile power unit, including a view of an interface panel 102. The interface panel 102 can include, for example, a user interface 104 such as a GUI, and a plurality of electrical connectors 106. The user interface is configured to provide an input and/or a display for a user to configure the mobile power unit into the desired operating mode, including selecting the desired electrical output and/or enabling/disabling one or more of the electrical connectors. In some embodiments, the desired electrical output is chosen by the user from a pre-selected group of common electrical outputs (e.g., 480 VAC 3-Phase, 208 VAC 3-Phase, 240 VAC 1-Phase, and 120 VAC 1-Phase). In another embodiment, the user can select any desired output voltage amplitude, frequency, and phase shift, allowing the mobile power unit to provide any user-selected electrical output. The mobile power unit can further be configured to provide a regulated DC output (e.g., for electric vehicle charging). In some embodiments, instead of being integrated into the interface panel, the user interface or GUI can be a remote device, such as a smartphone, tablet, or PC, which can be configured to communicate with and configure the mobile power unit via wireless technologies such as Bluetooth, WiFi, cellular, etc. System parameters and configurations can also be displayed to the user on the remote device. As the mobile power unit is often used outdoors, the mobile power unit can include a housing configured and designed to be exposed to the elements and general road conditions experienced by heavy duty trucks and buses, and is therefore designed to be resistant to shock/vibration/salt spray etc.

The mobile power unit 100 can include an electrical energy source disposed within the outer housing. In one configuration, the electrical energy source comprises a plurality of lithium-ion battery cell groups arranged in series connections. In other embodiments, the electrical energy source can comprise other known energy storage devices, such as ultracapacitors or fuel cells. While lithium-ion is presently the preferred battery cell type, it should be understood that other battery cells can be used in place of lithium-ion cells as battery technology evolves. In some examples, the electrical energy source can have an operating voltage range of 300-450V. In other embodiments, the electrical energy source can have a higher operating voltage range of 450V-1000V DC.

FIGS. 1B-1C illustrate side and top views, respectively, of the all-electric mobile power unit 100. As shown, the mobile power unit can include a trailer 108 configured to attach to a trailer hitch or tow vehicle, and a plurality of wheels 110 which allow for easy of transportation and delivery of the mobile power unit to remote sites. Although the interface panel 102 is shown on the rear of the mobile power unit in FIGS. 1A-1C, it should be understood that the interface panel can be positioned on any accessible surface of the mobile power unit. The size of the mobile power unit can vary depending on the output and energy storage capabilities, but in general, the mobile power unit itself can range in size from approximately 50" long, 30" wide, and 50" tall up to 150" long, 60" wide, and 60" tall. The trailer can add an extra 50-70" in length and 20-30" in height depending on the size and weight of the mobile power unit and the number and size of wheels required to carry the weight of the mobile power unit. In a preferred embodiment, the mobile power unit 100 is approximately 100" long, 40" wide, and 60" tall, with the trailer adding an additional 40-50" in length and 15-30" in height. In other embodiments, the mobile power unit can be scaled up or down in terms of operating voltage range and outputs, and the size of the mobile power unit can be adjusted accordingly.

In some embodiments, the mobile power unit can include safety measures to prevent movement/towing of the mobile power unit under certain conditions. For example, the mobile power unit can include a parking brake that can be automatically activated to prevent movement of the mobile power unit. This parking brake may be automatically activated when the mobile power unit is connected to a charging device, whenever the inverter is powered on, whenever other devices are plugged into and receiving power from the mobile power unit, and/or whenever the mobile power unit exits geofenced regions. For example, a construction or job site for a rental customer may be geofenced, and if the mobile power unit leaves the geofenced region, the parking brake may be activated to keep the mobile power unit at the approved jobsite or rental location.

Figure 1D:
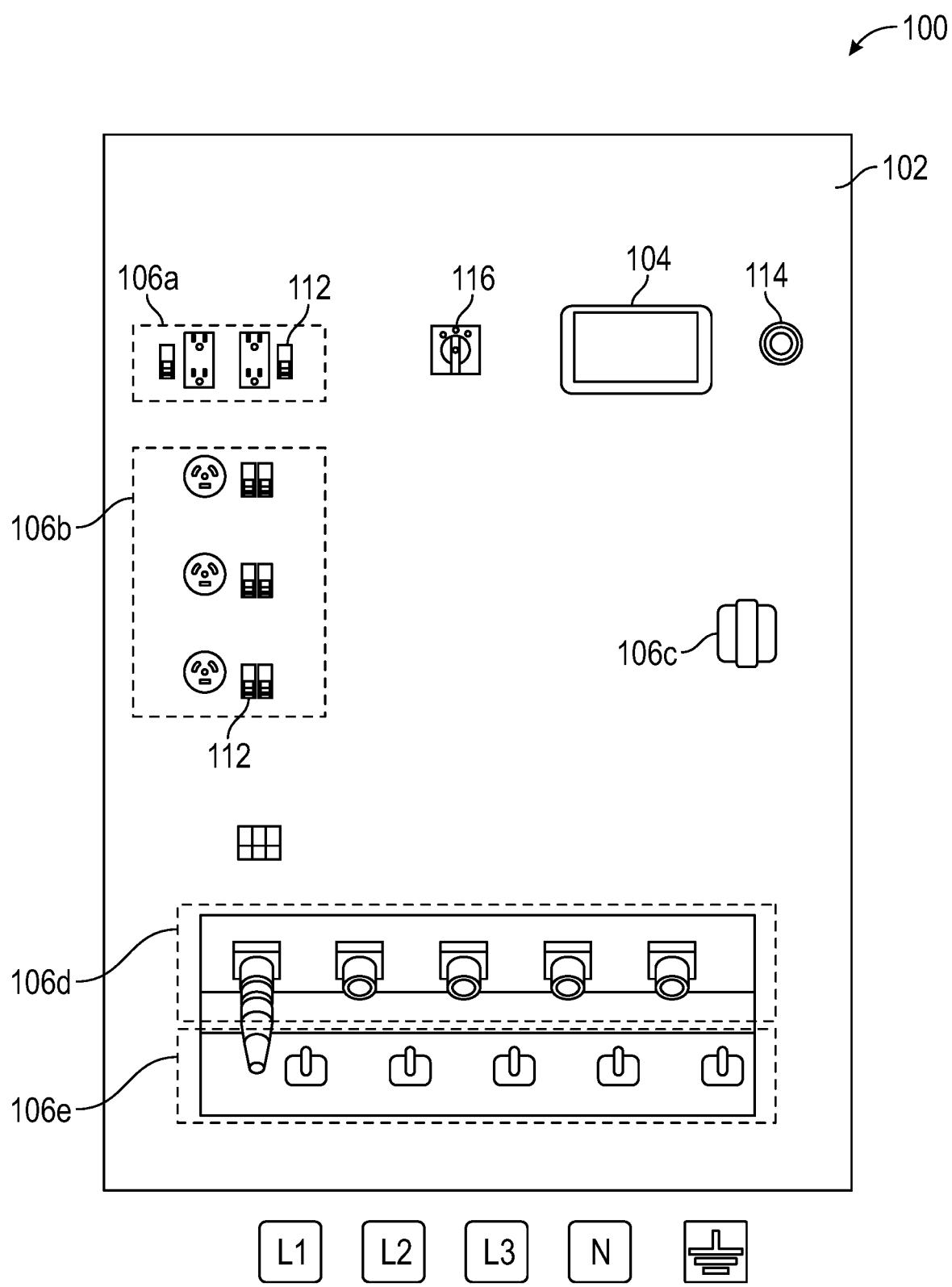

FIG. 1D is a close-up view of the interface panel 102 of mobile power unit 100, giving a better view of the user interface 104 and various electrical connectors 106a-106e. Referring to FIG. 1D, varying types of electrical connectors can be provided on the interface panel depending on the output and connection needs of the particular site. For example, the illustrated interface panel includes one or more North American Non-Locking receptacles 106a, one or more CS6365 receptacles 106b, one or more SAE J1772 connectors 106c, one or more taper nose cam lock connectors 106d, and/or one or more threaded fastener style connectors 106e. As shown in FIG. 1D, the connectors 106d and 106e can be configured to provide three-phase power outputs including line ends L1, L2, L3, active neutral line N, and a ground connection. While the illustrated connectors describe a configuration in one embodiment, it should be understood that in other embodiments, other types of electrical connectors can be utilized on the interface panel 102. Due to the nature of exposed connections for the terminal studs and cam locks, the interface panel can include a safety door with a position switch that will not allow the mobile power unit to operate unless the safety door is closed. This safety door can further include a locking feature configured to allow placement of a physical lock to support lock out tag out (LOTO) safety protocols.

Referring still to FIG. 1D, the interface panel 102 can further include circuit breakers 112, an emergency shutoff switch 114, and a voltage selector switch 116. The circuit breakers can be configured to prevent damage caused by excess current. In some implementations, each of the electrical connectors can have its own circuit breaker. The emergency shutoff switch 114 can be configured to shutoff/sever all electrical outputs of the mobile power unit in case of an emergency. The interface panel can further include an optional voltage selector switch 116 to easily switch between desired power outputs, such as between 480V 3-phase, 208V 3-phase, and 240V single-phase outputs. In the illustrated embodiment the voltage selector switch is a physical interface on the interface panel, but it should be understood that in other embodiments, the voltage selector switch can be implemented through the user interface 104, such as with a graphical selector within a GUI. In other embodiments, the user does not select from predetermined or pre-selected output options, but instead can customize the electrical output to any voltage amplitude, frequency, and/or phase shift. This user-selected custom voltage output can be implemented through the user interface 104.

Figure 2:
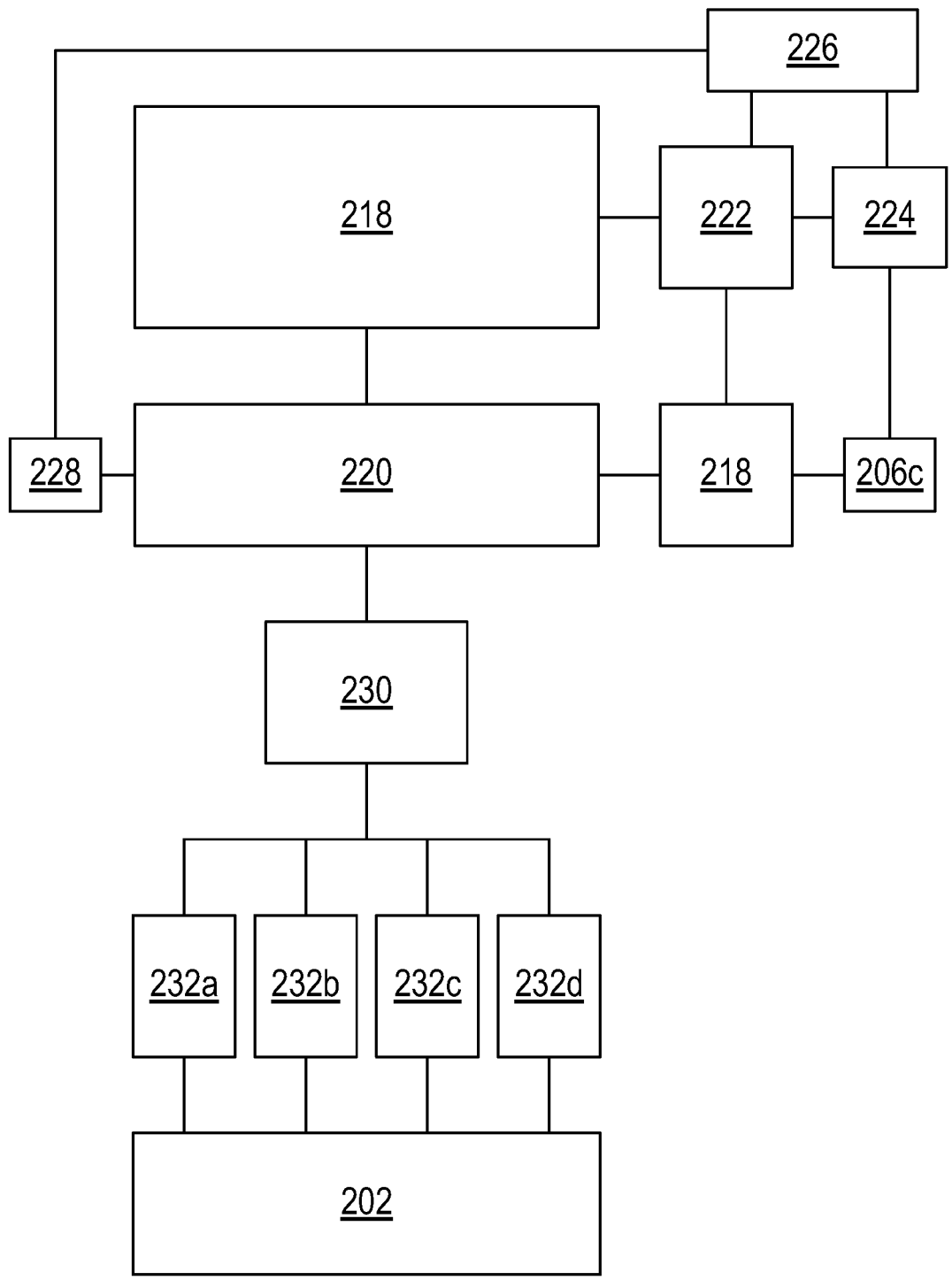
FIG. 2 is a schematic diagram illustrating the various components and electrical connections within the battery powered generator of FIGS. 1A-1D.

FIG. 2 is a schematic diagram illustrating the various components and electrical connections within the battery powered mobile power unit described above. Referring to FIG. 2, the mobile power unit can include an electrical energy source 218 which can comprise, for example, a plurality of battery cells as described above. The electrical energy source 218 can be electrically connected to a power distribution unit (PDU) 220, which includes a plurality of electrical inputs and outputs configured to distribute electrical power throughout the mobile power unit. The PDU can be in a centralized location within the mobile power unit for connection/disconnection/fusing of multiple electrical components.

Battery management can be controlled with a battery management system (BMS) 222. The BMS 222 is configured to monitor the state of every battery cell group and can measure any number of battery parameters, including voltage, temperature, current, etc. The BMS 222 is further configured to protect against over voltage, under voltage, measure resistance, estimate the state of charge, estimate the state of health, and measure power limits of each battery cell group. Additionally, the BMS is configured to monitor high voltage isolation resistance between the high voltage DC components (such as the electrical energy source, the BMS, the PDU, etc.) and a chassis of the mobile power unit to ensure that this isolation resistance is above acceptable thresholds. In the event of an isolation fault, the BMS can be configured to shut-down the system until the fault is cleared by enabling/disabling the electrical energy source.

The temperature measurement of the electrical energy source can be used by the BMS for estimations and as safety limits for over temperature and cold temperature charging limits to prevent lithium plating. The BMS can also be configured to perform cell group level balancing to maximize the performance of the system.

Battery charging can be controlled with an on-board battery charger 224. As shown, the on-board battery charger can be electrically coupled to both the PDU 220 and the electrical energy source 218 via the BMS 222. The battery charger is connected to/fused within the power PDU in case there is a short circuit. The battery charger can be air or liquid cooled and can be configured to regulate itself (i.e., if an over-temperature event were to occur the battery charger can automatically shut-down). The battery charger can communicate with the BMS 222 to regulate the charge current and ensure no cells in the electrical energy source are over-charged.

The mobile power unit can be configured to utilize existing electric vehicle charging infrastructure and components (the Combined Charging System, or CCS) to charge its battery energy source. Therefore, an optional CCS controller 224 can facilitate charging on the CCS network via an AC power source or alternatively via an off-board DC fast charger. The CCS controller 224 can be coupled to/configured to communicate with the BMS 222 and the electrical connector 206*c* to control the AC and/or DC charging of the electrical energy source on the CCS.

Charging of the electrical energy source 218 from external power sources can be accomplished via an electrical connector 206*c* on the interface panel of the mobile power unit. For example, a SAE J1772, such as the one described above in FIG. 1D, can be connected to an external power source to charge the mobile power unit. It should be understood that other electrical connector types can be used for charging the mobile power unit.

The mobile power unit can further include an overall system controller or electronic control unit (ECU) 226 which can configure/control the overall operation of the mobile power unit. In some embodiments, the controller can be integrated into the user interface or GUI described above. The system controller or ECU 226 can communicate with the other microcontrollers of the mobile power unit (such as the BMS 222, the CCS controller 224, etc.) via a Controller Area Network (CAN bus), for example. A low voltage DC/DC converter 228 can be used to regulate the voltage for the controllers and microcontrollers of the mobile power unit. For example, the low voltage DC/DC converter can convert the high voltage from the electrical energy source (e.g., 300-450V) to a much lower voltage (e.g., 12V) for the controllers and microcontrollers to operate on. The system controller can monitor all functions and features of the mobile power unit, and can be configured to communicate information to a distribution center via wired or wireless communication. For example, the system controller can monitor and communicate information relating to the mobile power unit or battery energy source, such state of charge, state of health, temperature, etc. to a remote location.

Operation of the mobile power unit and its configurable, variable outputs will now be discussed. Referring still to FIG. 2, the mobile power unit can further include a high voltage DC/DC converter 230 electrically coupled to the PDU 220. The high voltage DC/DC converter can be configurable to operate in a plurality of different modes. In one specific embodiment, the high voltage DC/DC converter can operate in two distinct configurations. For example, in a first configuration, the high voltage DC/DC converter can operate as a boost converter in which it is configured to boost the unregulated battery energy source voltage (e.g., an unregulated battery voltage of 300-450V) up to an elevated DC voltage that is regulated (e.g., such as up to a regulated 750-850V DC). Similarly, if the unregulated battery energy source voltage is lower than it should be (e.g., the expected source voltage is at least 325V, but the actual source voltage is lower), the boost converter could be configured to increase the source voltage to the expected source voltage. In some embodiments, the high voltage DC/DC converter can be configured to slowly ramp-up from the battery voltage to the higher voltage to avoid hard starting the system. In the second configuration, the high voltage DC/DC converter can operate as a pass-through, in which the output voltage is the same as the battery source voltage (e.g., an unregulated 300-450V). In other embodiments, it may be desirable to reduce the unregulated battery energy source voltage to a reduced DC voltage. For example, some embodiments of the mobile power unit include an energy source with a source voltage of up to 800V. In these implementations, it would therefore be necessary for the DC/DC converter to reduce the source voltage down to 300-450V in order to be able to produce all the desired voltage outputs. In these embodiments, the DC/DC converter could be, for example, a buck converter.

The mobile power unit can further comprise one or more inverter stages, or alternatively, a multi-stage inverter, electrically coupled to the output of the high voltage DC/DC converter. While these inverter stages are illustrated as inverter stages 232a-232d in FIG. 2, it should be understood that any number of inverter stages can be implemented depending on the desired output of the mobile power unit. In some embodiments, the inverter stages can utilize the same hardware as the high voltage DC/DC converter, but can instead be controlled differently through specific CAN bus commands from the system controller or ECU 226. In other embodiments, the inverter stages can implement different electrical topologies than illustrated/described herein. Each inverter stage has a DC input from the high voltage DC/DC converter and is configured to create an AC output utilizing 3-phases. In one specific implementation, each phase can support a current of 32 A for a total current of 96 A peak per phase (e.g., if the inverter stages are operated in parallel as a single phase). According to the present disclosure, the system controller or ECU is configured to combine the plurality of inverter stages at various phase shifts to create 3-phase and split-phase outputs, which are passed to the interface panel and the electrical connections as described above.

Figure 3A:
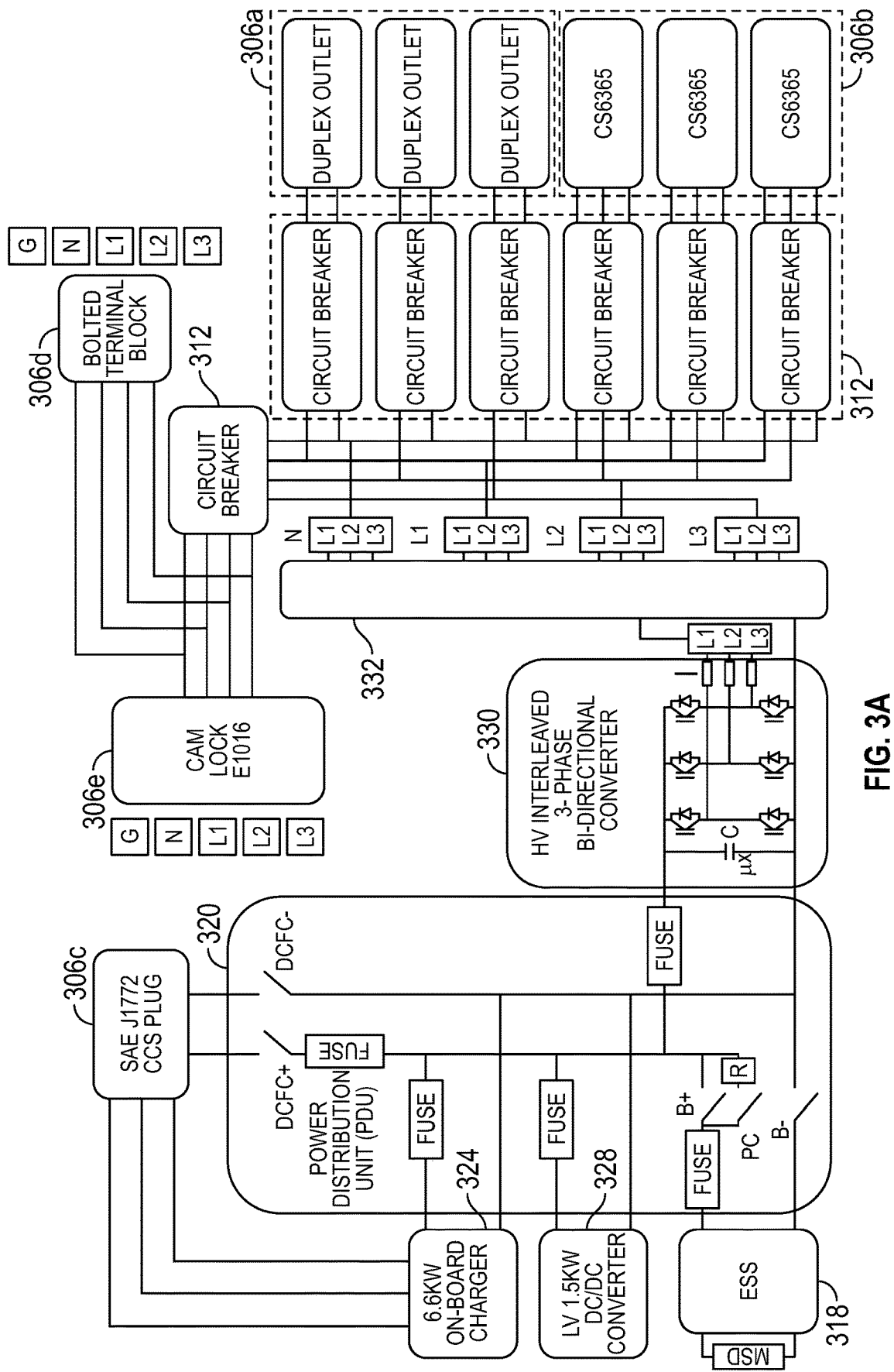
FIGS. 3A-3D are schematic illustrations of a power system of the generator of FIGS. 1A-1D, including operation modes configured to produce a user programmable output mode and/or user-selected outputs of 480 VAC 3-phase, 208 VAC 3-phase, and 240 VAC single-phase.

FIGS. 3A-3D illustrate one embodiment of a power system schematic of the mobile power unit as described above. These schematics illustrate how the various power outputs of the mobile power unit are delivered to the interface panel and electrical connectors of the mobile power unit. Referring to FIG. 3A, the mobile power unit can include the features and components described above in FIGS. 1D and 2, including NEMA receptacles 306a, CS6365 receptacles 306b, SAE J1772 connector 306c, taper nose cam lock connectors 306d, threaded fastener style connectors 306e, circuit breakers 312, battery energy source 318, PDU 320, CCS controller 324, low voltage DC/DC converter 328, high voltage DC/DC converter 330, and multi-stage inverter 332. While the system controller or ECU is not shown in this power system schematic, it should be understood that the system controller or ECU is configured to control the overall operation of the mobile power unit, including issuing commands to the various system components including the other microcontrollers, the high voltage DC/DC converter, and the multi-stage inverter. As shown, the multi-stage inverter 332 comprises four individual inverter stages with outputs N, L1, L2, and L3, but it should be understood that other implementations of multi-stage inverters or a plurality of single stage inverters can be implemented and remain within the scope of this disclosure.

Figure 3B:
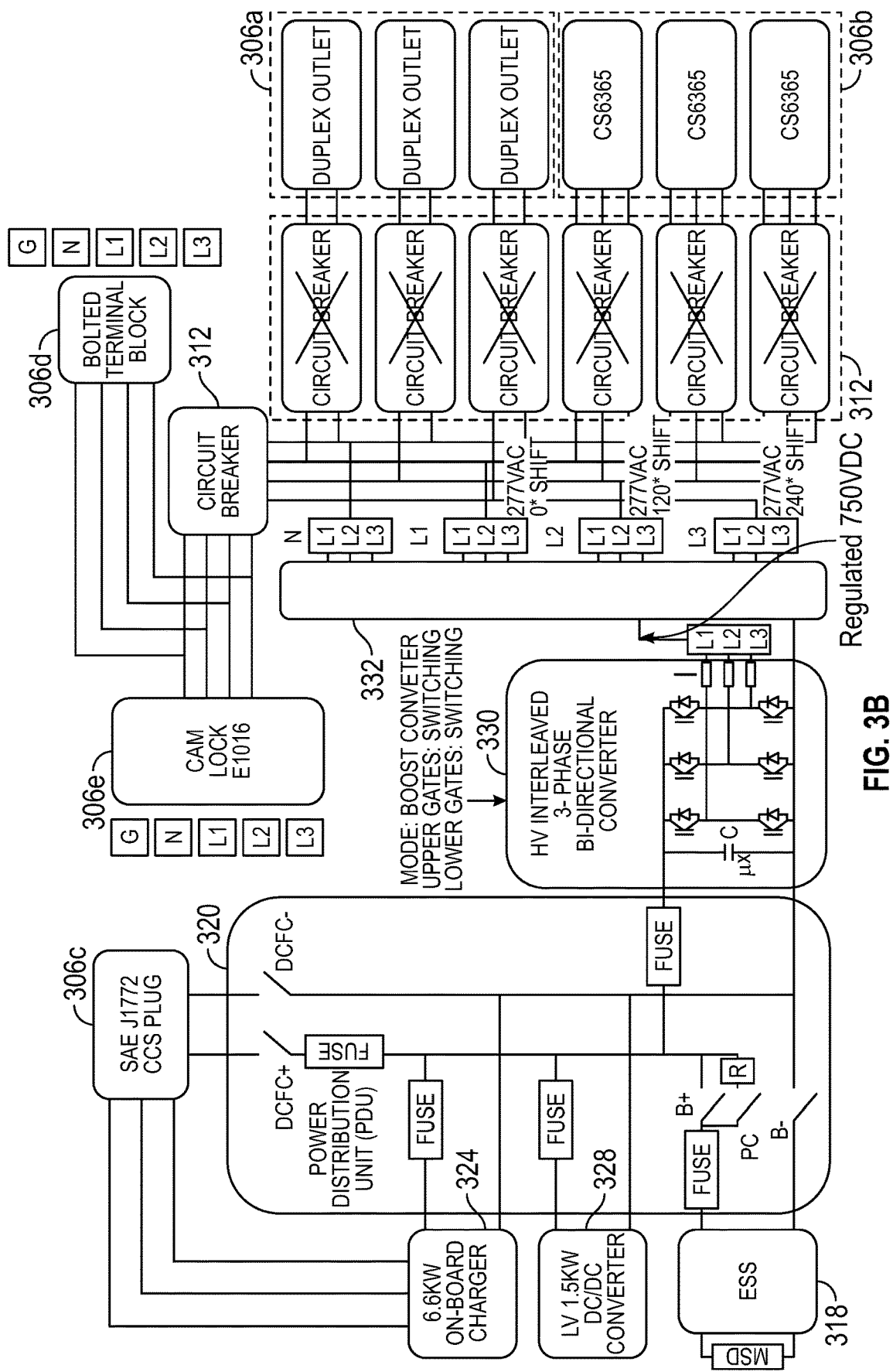

FIG. 3B illustrates the power system schematic of the mobile power unit in which the mobile power unit is configured to output a 480V AC 3-phase output to the interface panel and electrical connectors of the mobile power unit. In this operating mode, the ECU is configured to control the high voltage DC/DC converter to operate as a boost converter in which it is configured to boost the electrical energy source voltage (e.g., a battery voltage of 300-450V DC as shown) up to an elevated DC voltage that is regulated (e.g., a regulated voltage of 750V-1000V DC as shown). For example, the DC/DC converter can be a boost converter, and the ECU can control the boost converter to operate in boost mode to increase the voltage.

Referring still to FIG. 3B, with an input voltage of 750V DC as shown, each of the inverter stages is configured to create a 277V AC output with 35 kW of inverter power. A first inverter stage creates an active neutral line N, a second inverter stage creates line L1 with a 277 VAC output shifted by 0 degrees, a third inverter stage creates line L2 with a 277 VAC output shifted by 120 degrees, and a fourth inverter stage creates line L3 with a 277 VAC output shifted by 240 degrees. The system controller or ECU is configured to phase shift the outputs of each inverter stage (e.g., via the CAN bus) to be 120 degrees apart, as shown. The phase shifted 277 VAC outputs from lines L1, L2, and L3 then are combined to form the 480 VAC 3-Phase output. For this mode, the limiting factor is the high voltage DC/DC converter's current limit, therefore it is suggested to not to use the duplex connectors or CS6365 connectors when outputting the 480V AC 3-phase output, but only, for example, the tapered nose cam lock connectors 306d or the threaded fastener style connectors 306e. It should be understood that the DC/DC converter could be changed to increase the overall power level of the system. In some implementations, the circuit breakers 312 that are tied to the duplex outlets 306a and/or the CS6365 outlets 306b can be triggered, either manually or automatically, to disable the electrical connectors 306a and 306b.

Figure 3C:
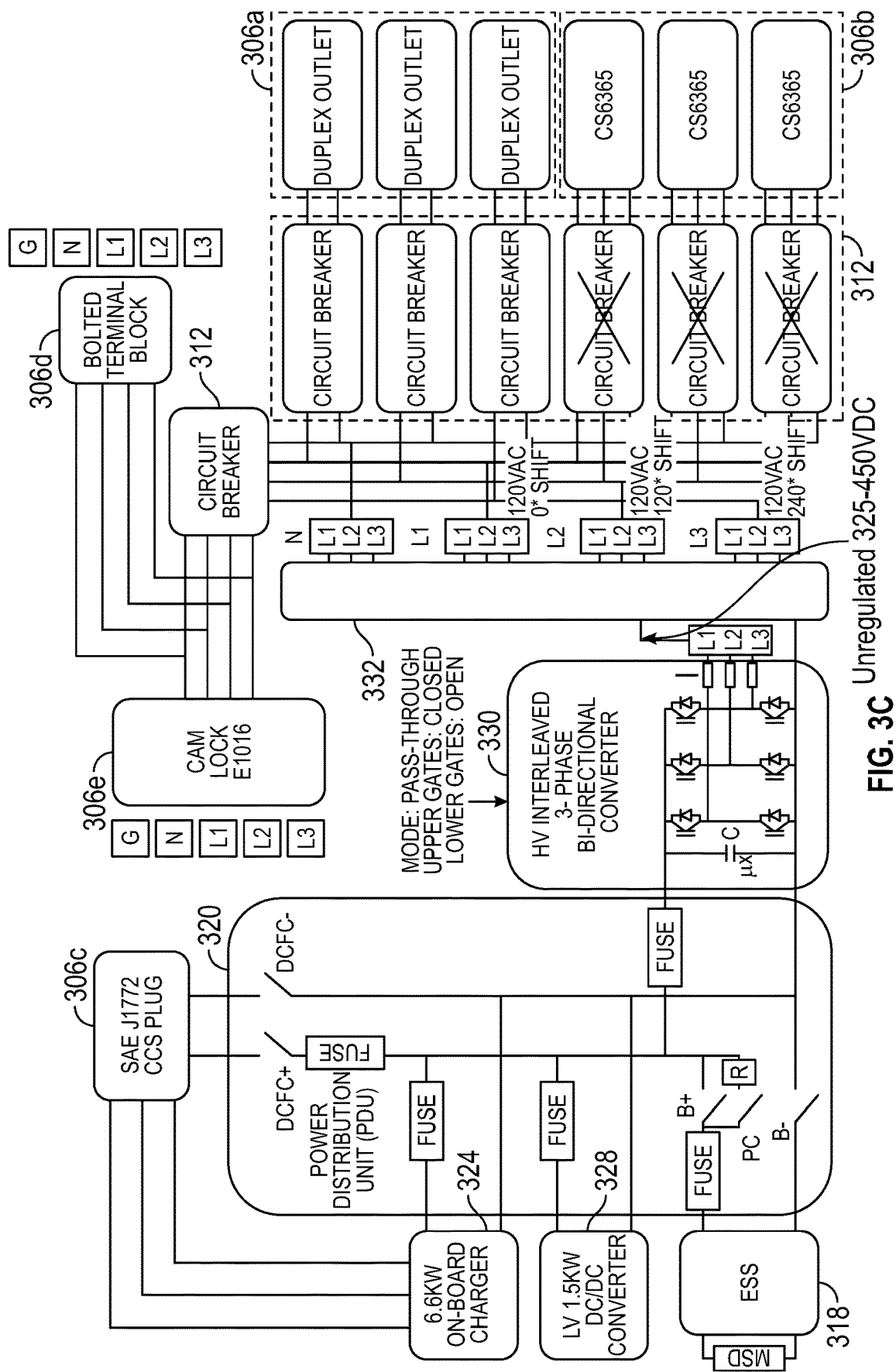

FIG. 3C illustrates the power system schematic of the mobile power unit in which the mobile power unit is configured to output a 208V AC 3-phase output to the interface panel and electrical connectors of the mobile power unit. In this operating mode, the ECU is configured to control the high voltage DC/DC converter to operate as a pass-through, in which the output voltage is roughly the same as the battery source voltage (e.g., an unregulated 300-450V DC). It should be understood that in real operating conditions, the pass-through switch will add some resistance to the circuit which will effectively reduce the voltage from the battery by up to 5V. For example, the ECU can control the high voltage DC/DC converter to operate as a pass-through to produce an unregulated output with the same voltage as the electrical energy source (e.g., 325-450V DC).

Referring still to FIG. 3C, with an input voltage of 325-450V DC as shown, each of the inverter stages is configured to create a 120V AC output referenced to neutral with 35 kW of inverter power. A first inverter stage creates an active neutral line N, a second inverter stage creates line L1 with a 120 VAC output shifted by 0 degrees, a third inverter stage creates line L2 with a 120 VAC output shifted by 120 degrees, and a fourth inverter stage creates line L3 with a 120 VAC output shifted by 240 degrees. The system controller or ECU is configured to phase shift the outputs of each inverter stage (e.g., via the CAN bus) to be 120 degrees apart, as shown. The phase shifted 120 VAC outputs from lines L1, L2, and L3 then are combined to form the 208 VAC 3-Phase output. For this mode, the limiting factor is the inverter stage current limits, therefore it is suggested to not to use the CS6365 connectors when outputting the 208V AC 3-phase output but only, for example, the tapered nose cam lock connectors 306d, the threaded fastener style connectors 306e, or the duplex connectors 306a. In some implementations, the circuit breakers 312 that are tied to the CS6365 connectors 306b can be triggered, either manually or automatically, to disable the electrical connectors 306b.

Figure 3D:
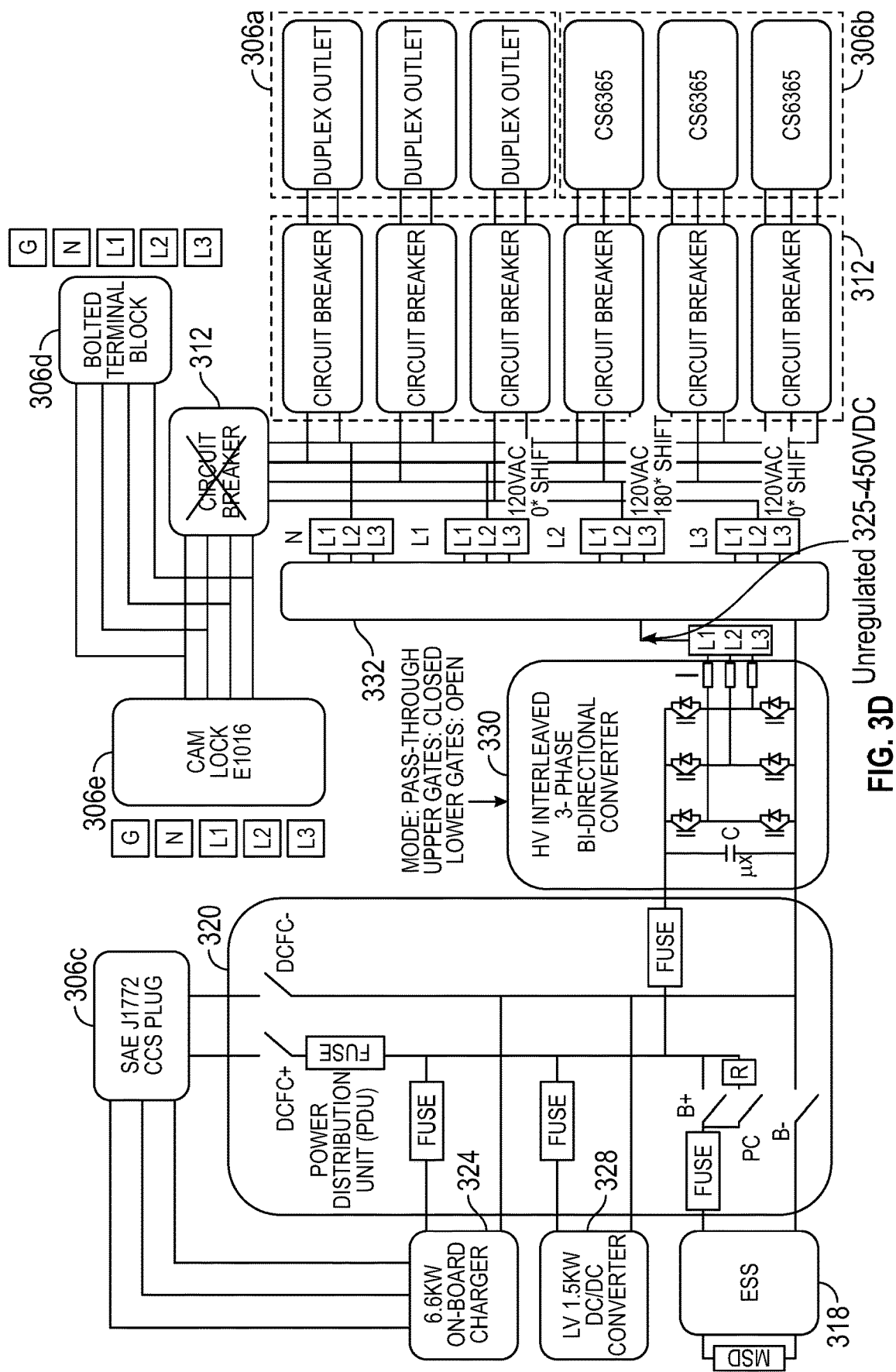

FIG. 3D illustrates the power system schematic of the mobile power unit in which the mobile power unit is configured to output a 240V AC single-phase output to the interface panel and electrical connectors of the mobile power unit. In this operating mode, the ECU is configured to control the high voltage DC/DC converter to operate as a pass-through, in which the output voltage is the roughly the same as the battery source voltage (e.g., an unregulated 325-450V DC). For example, the ECU can control the high voltage DC/DC converter to close the upper gates and allow the lower gates to pass current, as shown, produces an unregulated output with the same voltage as the electrical energy source (e.g., 325-450V DC).

Referring still to FIG. 3D, with an input voltage of 325-450V DC as shown, each of the inverter stages is configured to create a 120V AC output referenced to neutral with 23 kW of inverter power. A first inverter stage creates an active neutral line N, a second inverter stage creates line L1 with a 120 VAC output shifted by 0 degrees, a third inverter stage creates line L2 with a 120 VAC output shifted by 180 degrees, and a fourth inverter stage creates line L3 with a 120 VAC output shifted by 0 degrees. The system controller or ECU is configured to phase shift the outputs of the inverter stage associated with line L1 and line L2 (e.g., via the CAN bus) to be 180 degrees apart, as shown. The phase shifted 120 VAC outputs from lines L1, L2, and L3 then are combined to form the 240 VAC single-Phase output. The ECU can be further configured to cause the inverter stage associated with line L3 to operate in phase with line L1. In one embodiment, lines L1 and L2 can be configured to power the split phase CS6365 electrical connectors 306b, and line L3 can power one of the duplex outlets 306a. For this mode, the limiting factor is the inverter stage current limits, therefore it is suggested to not to use the tapered nose cam lock connectors 306d or the threaded fastener style connectors 306e when outputting the 240V AC single-phase output, but only, for example, the duplex connectors 306a or the CS6365 connectors 306b. In some implementations, the circuit breakers 312 that are tied to the tapered nose cam lock connectors 306d or the threaded fastener style connectors 306e can be triggered, either manually or automatically, to disable the electrical connectors 306d and 306e.

In some embodiments, the mobile power unit can be configured to output any user-selected or user-chosen electrical output. In this embodiment, the user can select, via the user interface, any desired output voltage amplitude, frequency, and/or phase shift, allowing the mobile power unit to provide any user-selected electrical output. For example, in some regions, such as North America, commonly desired output voltages are 480 VAC 3-Phase, 208 VAC 3-Phase, 240V 1-Phase, and 120V 1-Phase, all at a frequency of 60 Hz. In other regions the desired output voltage may be 400V-3 Phase, 230V-1 Phase, 110V-1 Phase all at 50 Hz.

As described above, an optional boost converter and the inverter stages in combination with customized phase shifts (via the CAN bus) can be configured to provide customizable/configurable electrical outputs. For example, in the embodiment of FIG. 3B described above, the battery voltage is boosted with a boost converter and then the outputs of each inverter stage are phase shifted by 120 degrees to achieve the 480 VAC 3-Phase output. The same methodology can be used to produce any desired electrical output, within the hardware limitations of the mobile power unit. Generally, however, the mobile power unit can be configured to provide AC voltages between about 100V up to about 500V, and generally between a frequency of 50 Hz and 60 Hz. However, in some embodiments, the mobile power unit can operate at frequencies up to 400 Hz (commonly used in military applications). Customized and automated voltages, frequencies, and phase shifts on lines L1, L2, and L3 can be specified by the end user then automatically configured by the mobile power unit (e.g., by one or more of the electronic controllers or the CAN bus) to achieve the desired voltage output.

The phases may also be controlled independently of one another in order to create less common output voltages such as "Wide Leg 240V" in which Line 1 has a L-N Voltage of 120V, Line 2 has a L-N Voltage of 208V, and Line 3 has a L-N Voltage of 120V. The Line 1 to Line 3 voltage is 240V which means they are 180 degrees out of phase. Table 1 describes the various amplitudes, frequency, and phase shift for a "Wide Leg 240V" output:

TABLE 1

| Wide Leg 240 | Amplitude (L-N) | Amplitude (L-L) | Frequency | Phase Shift |
|---|---|---|---|---|
| Line 1 | 120 V | 240 V | 60 Hz | 0 Degrees |
| Line 2 | 208 V | 240 V | 60 Hz | 120 Degrees |
| Line 3 | 120 V | 240 V | 60 Hz | 180 Degrees |

In another embodiment the user can increase and decrease the output voltage setpoint of the unit as desired. This feature can be useful for compensating for line losses over a long cable distance.

The general range of voltages for common AC power transmission is between 100V up to 480V and 50 Hz or 60 Hz. Specialized equipment such as aircraft, ships, may require other AC power sources such as 120V at 400 Hz or 450V 400 Hz. For other applications where it is desired for the phases to be in sync such as powering RV's, two lines can be set to 120V with 0 Degrees of phase shift. The other two outputs can both be set to active neutral in order to maximize the system capabilities. As described above, the user can input the desired output through the use of a human machine interface (HMI) such as a touch screen or remotely through an external device.

The techniques described above include controlling a DC/DC converter and a plurality of inverter stages to achieve the desired voltage and phase output. For example, as described above, the DC/DC converter can be operated as a boost converter to boost an input voltage of 325-450V to a voltage of 750-800V, and then the inverter stages can be controlled to create a 480V 3-phase output. Similarly, the DC/DC converter can be operated as a pass-through to pass the 325-450V input voltage to the inverter stages, which can then be controlled to produce a 208V 3-phase output (e.g., FIG. 3C) or a 240V single-phase output (e.g., FIG. 3D). It should be understood that other implementations can be used when the input voltage, such as the voltage from the battery source, is lower or higher than the 325-450V range described above. For example, if the battery source has a voltage on the order of 750-800V, the DC/DC converter can instead comprise a buck converter. In this embodiment, to produce the 480V 3-phase output, the DC/DC converter can be operated as a pass-through (e.g., the 750-800V voltage from the battery is passed through to the inverter stages). Alternatively, to produce the 208V 3-phase output or the 240V single-phase output, the DC/DC converter can be operated as a buck converter, and the battery voltage can be reduced from the 750-800V down to the desired 325-450V voltage, which can then be used by the inverter stages to produce the desired output.

Figure 4A:
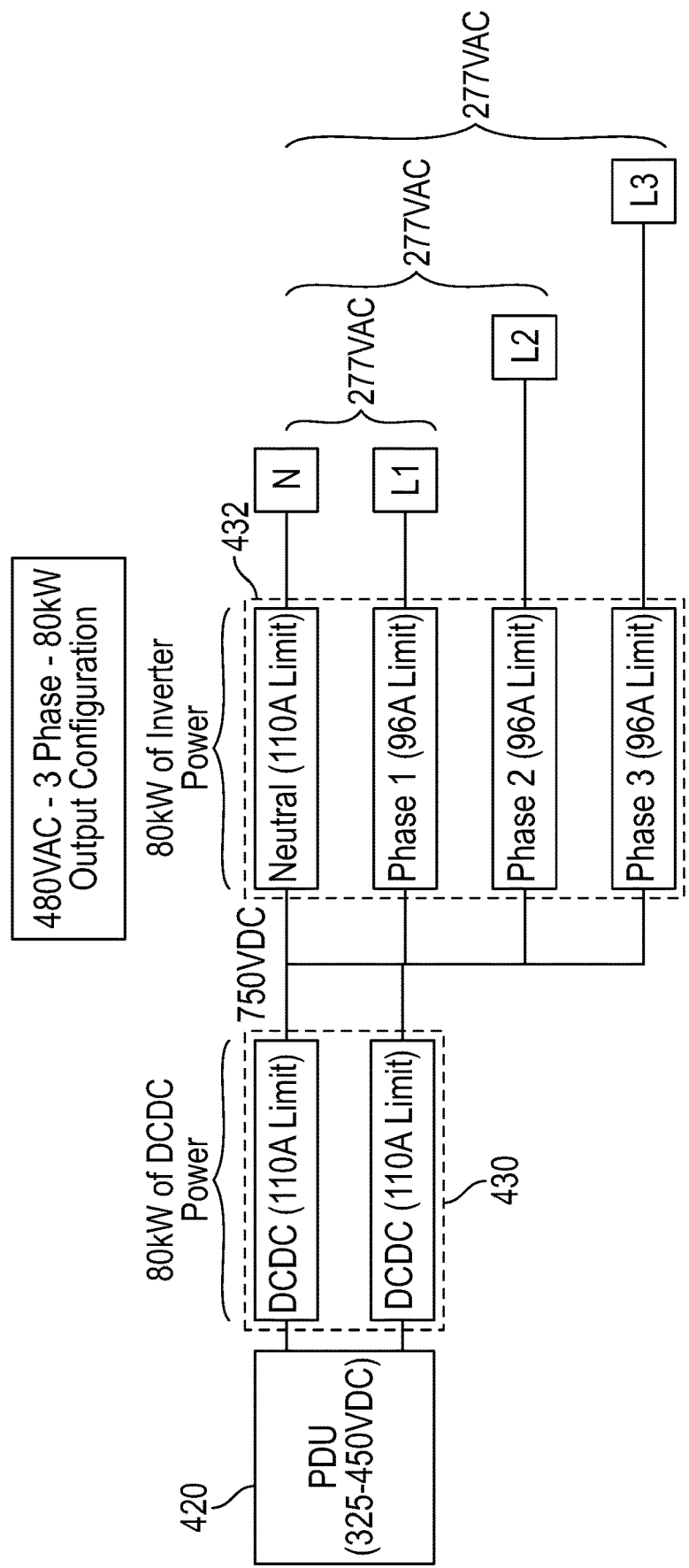
FIGS. 4A-4F are schematic illustrations of another embodiment of a power system configured to produce user-selected outputs.

While the specific embodiments described above in FIGS. 3A-3D are configured to output between 23 kVA-80 kVA of inverter power depending on the configuration, alternative designs can be implemented which increase the inverter power output. Referring to the embodiment of FIG. 4A, a power system schematic for a mobile power unit is shown in which a pair of high-voltage DC/DC converters 430 arranged in parallel with the PDU 420 are configured to produce a 480V 3-phase output with 80 kVA of inverter power via the multi-stage inverter 432. A first inverter stage creates an active neutral line N, a second inverter stage creates line L1 with a 277 VAC output, a third inverter stage creates line L2 with a 277 VAC output, and a fourth inverter stage creates line L3 with a 277 VAC output. These stages can be combined as described above in FIG. 3B with appropriate phase shifts to produce a 480V 3-phase output, with an increased power output of 80 kVA compared to the example above.

Figure 4B:
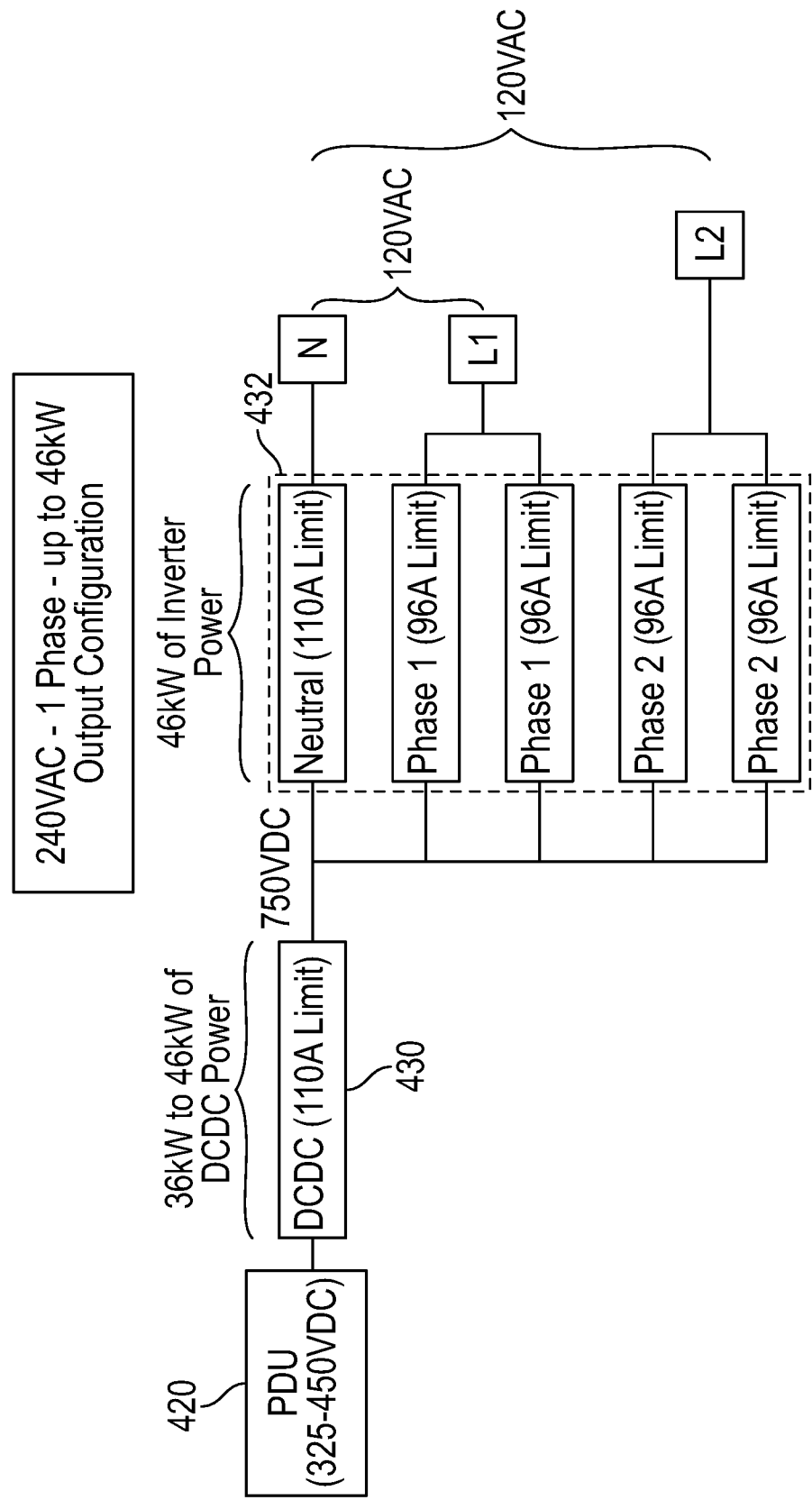

FIG. 4B illustrates a power schematic in which the multi-stage inverter is arranged to produce a 240V single-phase output with up to 46 kW of inverter power. In this arrangement, a single high-voltage DC/DC converter 430 is connected to the PDU 420 and to the multi-stage inverter 432. A first inverter stage creates an active neutral line N, a pair of inverter stages in parallel create line L1 with a 120 VAC output, and a pair of inverter stages in parallel create line L2 with a 120 VAC output, which can be combined with a phase shift of 180 degrees to create the overall output of 240V single-phase.

Figure 4C:
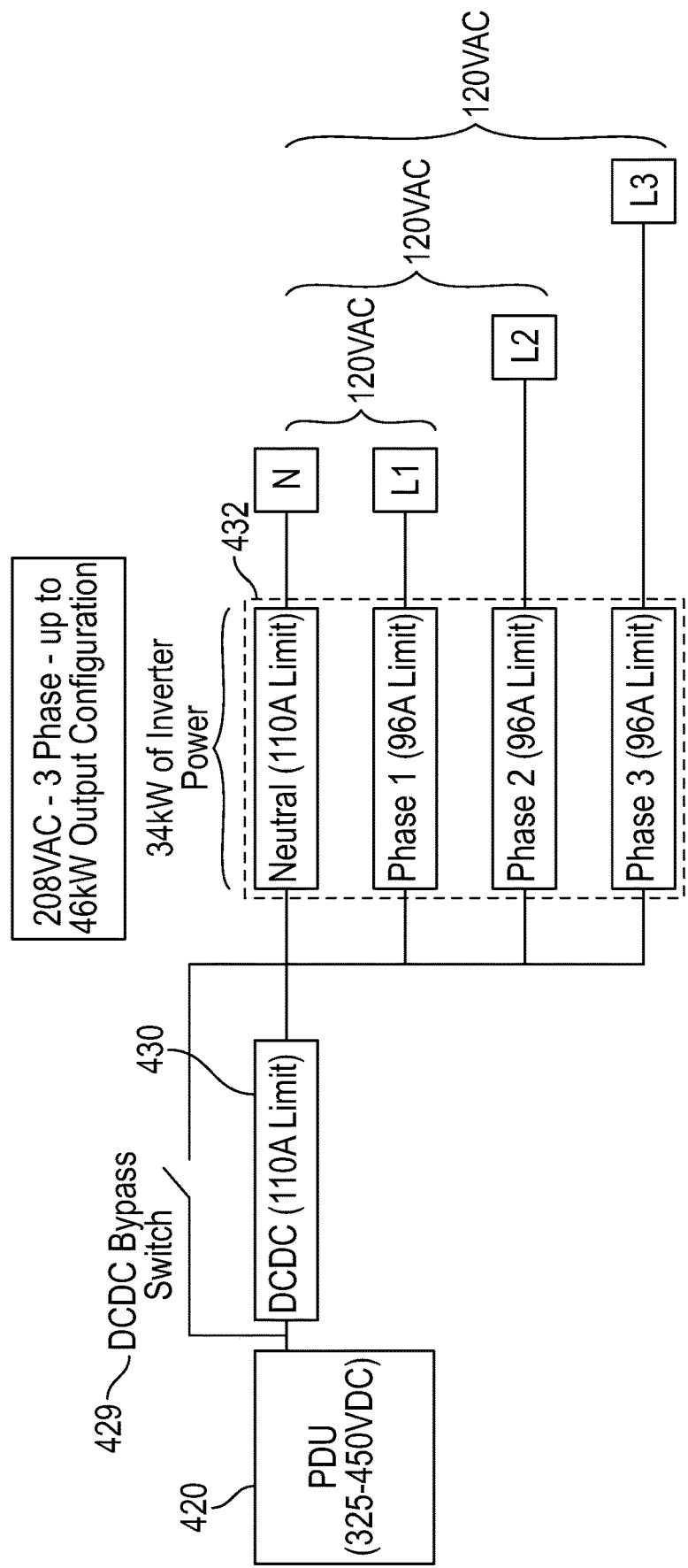

FIG. 4C illustrates a power schematic in which the multi-stage inverter is arranged to produce a 208V 3-phase output with up to 34 kW of inverter power. In this arrangement, a single high-voltage DC/DC converter 430 is connected to the PDU 420 and to the multi-stage inverter 432. A first inverter stage creates an active neutral line N, a second inverter stage creates line L1 with a 120 VAC output, a third inverter stage creates line L2 with a 120 VAC output, and a fourth inverter stage creates line L3 with a 120 VAC output. When the DC/DC converter 430 is bypassed with a DC/DC bypass switch 429, these stages can be combined with a phase shift of 120 degrees to produce a 208V 3-phase output with a power output of 34 kW.

Figure 4D:
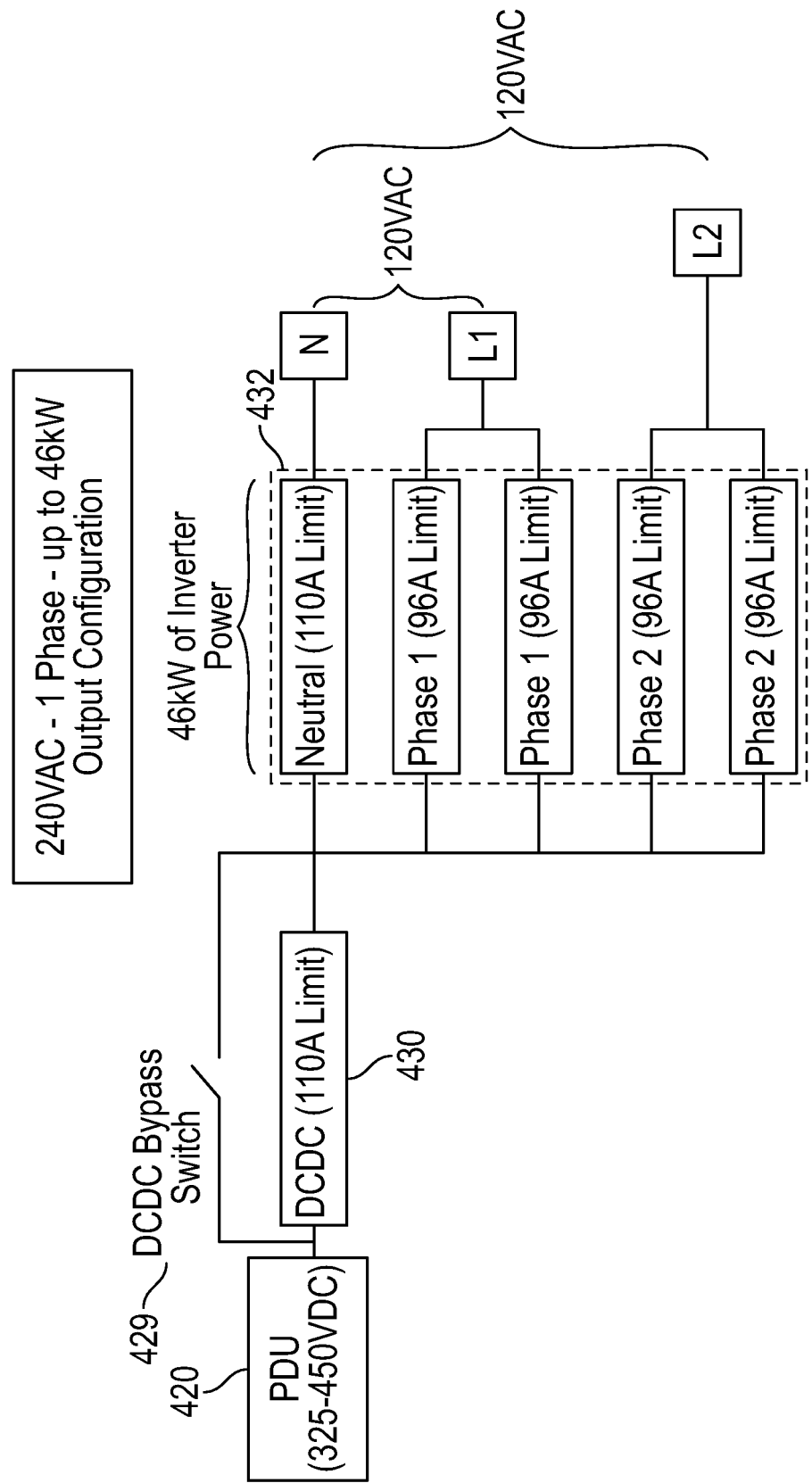

FIG. 4D illustrates a power schematic in which the multi-stage inverter is arranged to produce a 240V single-phase output with up to 46 kW of inverter power. In this arrangement, a single high-voltage DC/DC converter 430 is connected to the PDU 420. A first inverter stage creates an active neutral line N, a pair of inverter stages in parallel create line L1 with a 120 VAC output, and a pair of inverter stages in parallel create line L2 with a 120 VAC output, which can be combined with a phase shift of 180 degrees to create the overall output of 240V single-phase. The DC/DC converter 430 can be bypassed with DC/DC bypass switch 429 as shown.

Figure 4E:
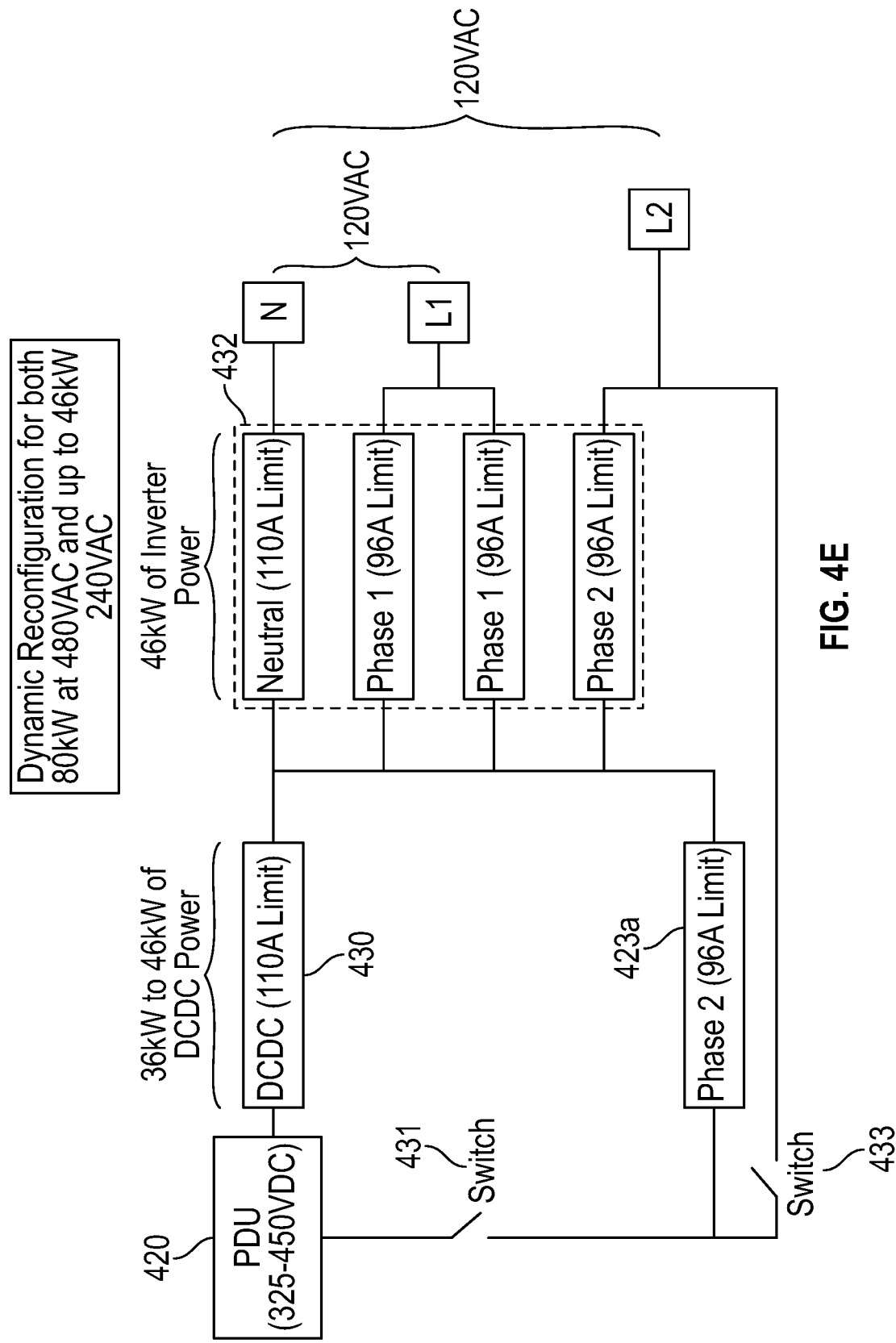

The concepts described above can be combined to provide a dynamic reconfiguration that provides 80 kW of power output at 480V 3-phase and up to 46 kW of power output at 240V 3-phase. Referring to FIG. 4E, a power schematic is shown in which the multi-stage inverter can be configured to produce a 480V 3-phase output with 80 kW of power in a first configuration in which Switch 431 is closed and Switch 433 is open, and can also be configured to produce a 240V single-phase output with up to 46 kW of inverter power in a second configuration in which Switch 431 is open and Switch 433 is closed. In the 480V mode, the inverter stage 432a acts as a boost converter in parallel, and in the 240V mode, the inverter stage 432a acts as an inverter stage.

Figure 4F:
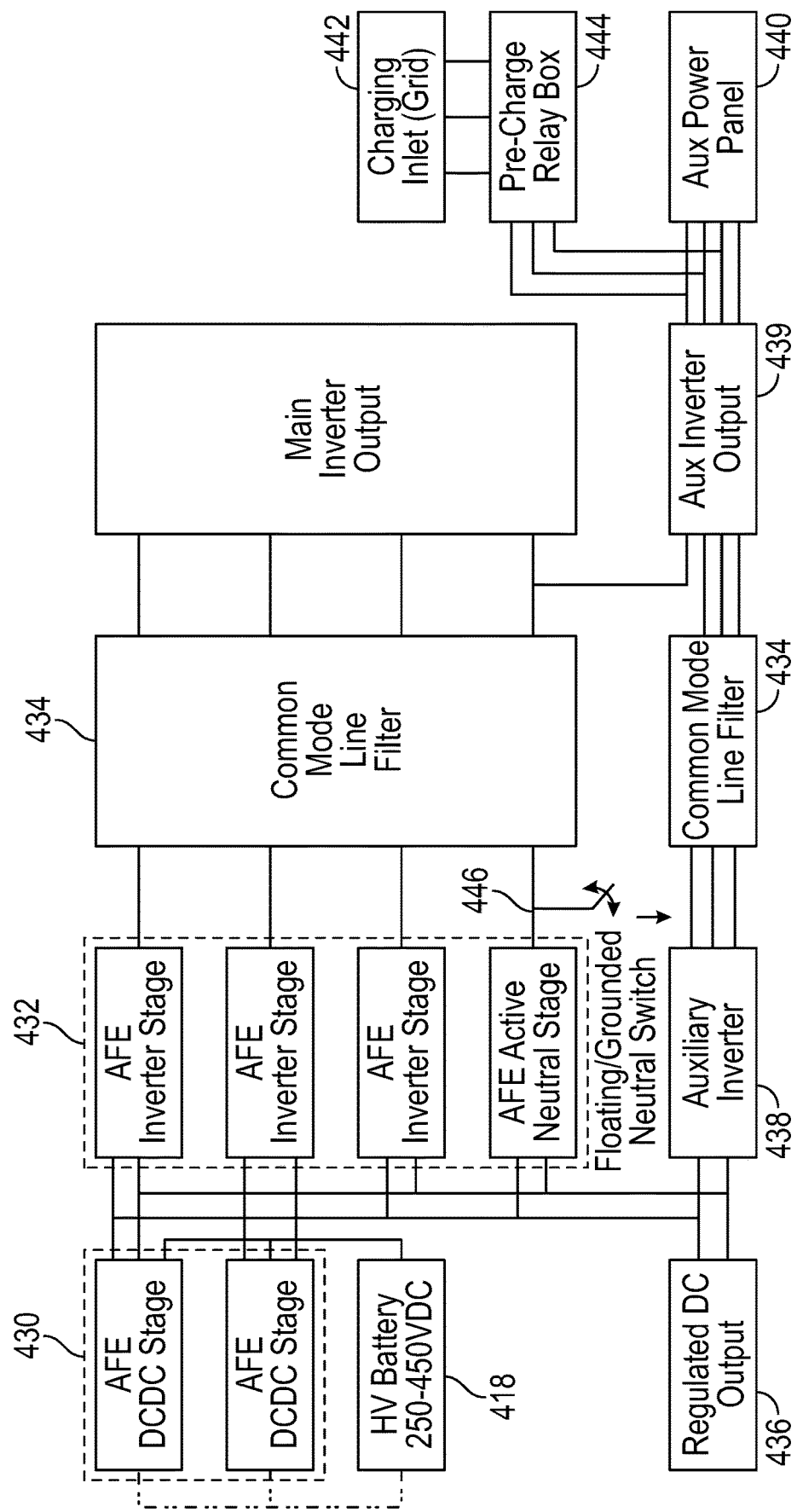

FIG. 4F is another power schematic for a mobile power unit with additional features. As with the schematics above, the mobile power unit can include an electrical energy source 418, one or more DC/DC converters 430, and a plurality of inverter stages 432. The outputs from the plurality of inverter stages 432 can optionally pass through a common mode line filter 434 before being output (e.g., at the outlets of the mobile power unit as described above).

In one embodiment, the power conversion system can output a regulated DC voltage 436 directly from the DC/DC converter(s) 430. The DC/DC converter(s) can be configured to regulate the current between the electrical energy source of the mobile power unit and another electrical energy source, such as a battery pack of an electric vehicle. This can be used for DC charging other devices such as an electric vehicle.

Still referring to FIG. 4F, the mobile power unit can include an auxiliary inverter 438 that can be configured to provide an electrical output 439 to an auxiliary power panel 440. In some embodiments, for example, this auxiliary power panel can provide simple 110 VAC 1-Phase outputs (e.g., standard north American power outlets). The auxiliary inverter 438 provides these outputs regardless of what operating mode or outputs are being provided the other plurality of inverters 432 of the mobile power unit. In some embodiments, the output passes through a common mode line filter 434 before going to the auxiliary power panel.

In some embodiments, the auxiliary inverter 438 can be used to recharge the electrical energy source 418 via grid power. Referring still to FIG. 4F, the mobile power unit can be hooked up to grid power with charging inlet 442. The AC power from the charging inlet can pass through a pre-charge relay box 444, when can then pass through the auxiliary inverter 438 to convert the AC signal to a DC voltage. the auxiliary inverter can then be configured to regulate the charging of the electrical energy source 418 without the need for dedicated charging controllers and hardware within the mobile power unit.

In another embodiment, still referring to FIG. 4F, a user can select if they desire the electrical neutral connection to be floating or grounding. If it is desired to be grounded, a relay 446 is configured to open to connect the neutral line to the chassis ground at a single source point. If the user instead desires a floating connection, the relay can be opened so that the neutral line will not be coupled to the chassis ground.

Figure 5A:
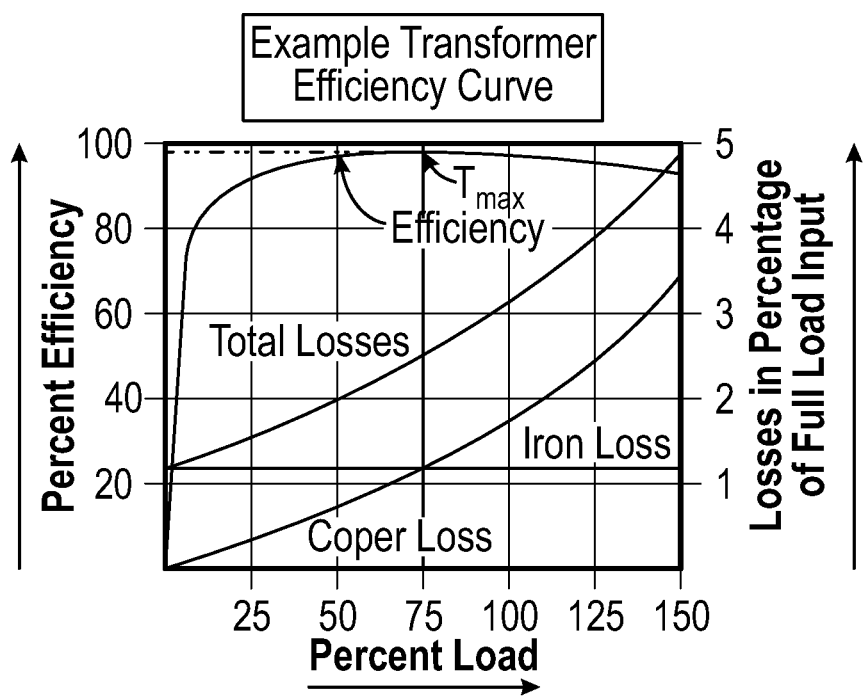
FIGS. 5A-5B are illustrations showing efficiency improvements obtained by the power systems of this disclosure.
Figure 5B:
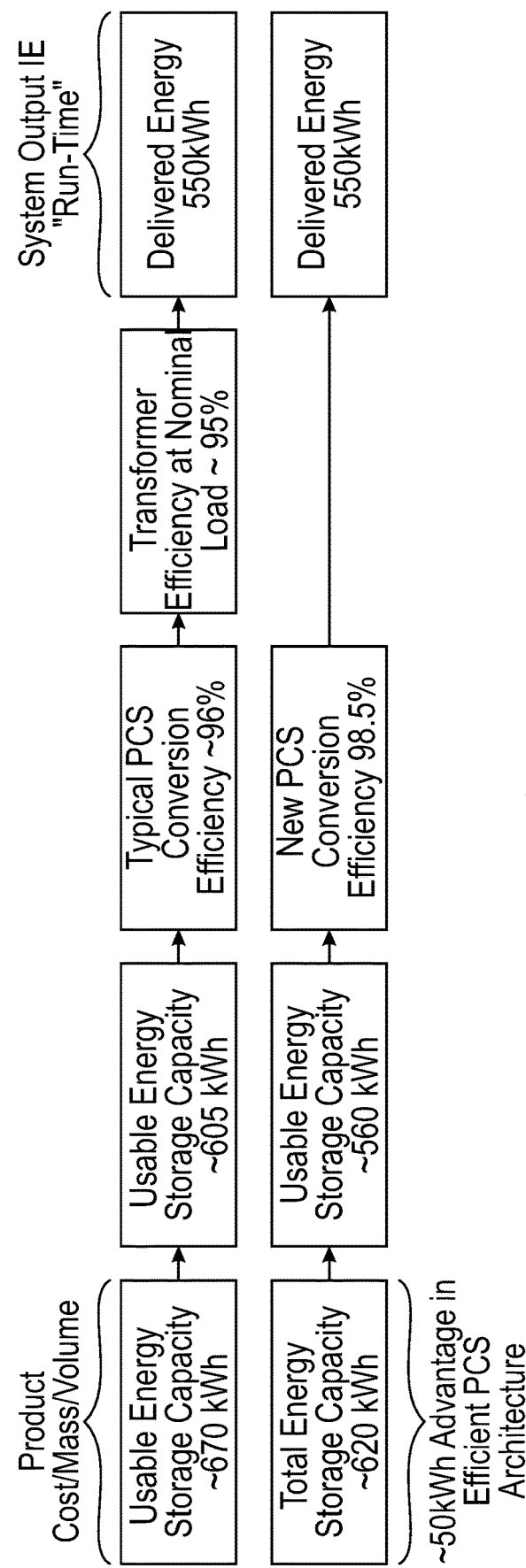

The mobile power units described herein provide large gains in efficiency compared to typical diesel generators. As shown in FIGS. 5A-5B, a typical diesel generator has a very low PCS conversion efficiency. Transformers further reduce the efficiency of these designs (with a typical transformer efficiency of 95%). Thus, a typical system requires up to 670 kWh of energy storage to be able to deliver 550 kWh of energy output. In comparison, embodiments of the systems described herein require only 620 kWh of energy storage capacity to provide an output of 550 kWh, providing a 50 kWh advantage over prior systems. These efficiencies allow the systems described herein to be produced at a lower cost and potentially at a smaller size compared to conventional systems, while also providing energy efficiency and emissions benefits as discussed.

The mobile power unit described above, including the electrical components, can utilize advanced silicon carbide (SiC) switching technology which allows it to operate at very high frequencies, thus enabling high-efficiency and low magnetic component sizes. In certain low power situations, it may be desirable for each inverter stage to reduce to 2 or even 1 phase in order to reduce switching losses and improve efficiency. This strategy is known as "phase shedding."

As for additional details pertinent to the present invention, materials and manufacturing techniques may be employed as within the level of those with skill in the relevant art. The same may hold true with respect to method-based aspects of the invention in terms of additional acts commonly or logically employed. Also, it is contemplated that any optional feature of the inventive variations described may be set forth and claimed independently, or in combination with any one or more of the features described herein. Likewise, reference to a singular item, includes the possibility that there are plural of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

What is claimed is:

1. An all-electric, battery powered mobile power unit, comprising:
   a DC electrical energy source having a primary battery voltage of 300-450 VDC;
   a power conversion system coupled to the DC electrical energy source, the power conversion system including a high voltage DC/DC converter and a plurality of inverter stages; and
   an electronic controller configured to control operation of the power conversion system to produce a user-selected voltage output and a user-selected phase configuration selected from the group consisting of 480 VAC 3-phase, 208 VAC 3-phase, and 240 VAC single-phase;
   wherein when the user-selected voltage output and phase configuration comprises 480 VAC 3-phase, the electronic controller is configured to:
   control the high voltage DC/DC converter to operate as a boost converter in which the primary battery voltage from the DC electrical energy source is increased to a secondary voltage of between 750 VDC and 800 VDC; and
   control the plurality of inverter stages to phase shift the outputs of the plurality of inverter stages to be 120 degrees apart.

2. The mobile power unit of claim 1, wherein
   the high voltage DC/DC converter is electrically coupled to the DC electrical energy source and
   the plurality of inverter stages is electrically coupled to the high voltage DC/DC converter.

3. The mobile power unit of claim 1, wherein:
   a neutral line corresponding to a first output of a first of the plurality of inverter stages is in phase with a line L1 corresponding to a second output of a second of the plurality of inverter stages;
   a line L2 corresponding to a third output of a third of the plurality of inverter stages is phase shifted by 120 degrees from the line L1; and
   a line L3 corresponding to a fourth output of a fourth of the plurality of inverter stages is phase shifted by 120 degrees from the line L2.

4. The mobile power unit of claim 3, wherein the electronic controller is configured to provide the 480 VAC 3-phase output to only a subset of electrical connections on an interface panel of the mobile power unit.

5. The mobile power unit of claim 4, wherein the electronic controller is configured to provide the 480 VAC 3-phase output to only one or more tapered nose cam lock connectors or one or more threaded fastener style connectors on the interface panel of the mobile power unit.

6. The mobile power unit of claim 5, wherein the electronic controller is configured to trigger circuit breakers associated with duplex connectors or CS6365 connectors on the interface panel of the mobile power unit to prevent the 480 VAC 3-phase output from reaching the duplex connectors or CS6365 connectors.

7. The mobile power unit of claim 1, wherein when the user-selected voltage output and phase configuration comprises 208 VAC 3-phase, the electronic controller is configured to:
   control the high voltage DC/DC converter to operate as a pass-through, in which a primary battery voltage from the DC electrical energy source is provided as a secondary voltage; and
   control the plurality of inverter stages to phase shift the outputs of the plurality of inverter stages to be 120 degrees apart.

8. The mobile power unit of claim 7, wherein the primary battery voltage from the DC electrical energy source comprises 300-450 VDC and the secondary voltage also comprises 300-450 VDC.

9. The mobile power unit of claim 7, wherein:
   a neutral line corresponding to a first output of a first of the plurality of inverter stages is in phase with a line L1 corresponding to a second output of a second of the plurality of inverter stages;
   a line L2 corresponding to a third output of a third of the plurality of inverter stages is phase shifted by 120 degrees from the line L1; and
   a line L3 corresponding to a fourth output of a fourth of the plurality of inverter stages is phase shifted by 120 degrees from the line L2.

10. The mobile power unit of claim 7, wherein the electronic controller is configured to provide the 208 VAC 3-phase output to only a subset of electrical connections on an interface panel of the mobile power unit.

11. The mobile power unit of claim 10, wherein the electronic controller is configured to provide the 208 VAC 3-phase output to only one or more tapered nose cam lock connectors, one or more threaded fastener style connectors, or one or more duplex connectors on the interface panel of the mobile power unit.

12. The mobile power unit of claim 11, wherein the electronic controller is configured to trigger circuit breakers associated with CS6365 connectors on the interface panel of the mobile power unit to prevent the 208 VAC 3-phase output from reaching the CS6365 connectors.

13. The mobile power unit of claim 1, wherein when the user-selected voltage output and phase configuration comprises 240 VAC single-phase, the electronic controller is configured to:
   control the high voltage DC/DC converter to operate as a pass-through, in which a primary battery voltage from the DC electrical energy source is provided as a secondary voltage; and
   control the plurality of inverter stages to phase shift first and second outputs of the plurality of inverter stages to be 180 degrees apart.

14. The mobile power unit of claim 13, wherein the primary battery voltage from the DC electrical energy source comprises 300-450 VDC and the secondary voltage also comprises 300-450 VDC.

15. The mobile power unit of claim 13, wherein:
a neutral line corresponding to a first output of a first of the plurality of inverter stages is in phase with a line L1 corresponding to a second output of a second of the plurality of inverter stages, and is in phase with a line L3 corresponding to a third output of a third of the plurality of inverter stages;
a line L2 corresponding to a fourth output of a fourth of the plurality of inverter stages is phase shifted by 180 degrees from the neutral line, the line L1, and the line L3.

16. The mobile power unit of claim 15, wherein the electronic controller is configured to provide the 240 VAC single-phase output to only a subset of electrical connections on an interface panel of the mobile power unit.

17. The mobile power unit of claim 16, wherein the electronic controller is configured to provide the 240 VAC single-phase output to only one or more duplex connectors or one or more CS6365 connectors on the interface panel of the mobile power unit.

18. The mobile power unit of claim 16, wherein the electronic controller is configured to trigger circuit breakers associated with tapered nose cam lock connectors or the threaded fastener style connectors on the interface panel of the mobile power unit to prevent the 240 VAC single-phase output from reaching the tapered nose cam lock connectors or the threaded fastener style connectors.

19. The mobile power unit of claim 1, wherein the DC electrical energy source comprises at least 600 kWh of energy storage.

20. The mobile power unit of claim 1, wherein the DC electrical energy source comprises at least 500 kWh of energy storage.

21. The mobile power unit of claim 1, wherein the DC electrical energy source comprises at least 750 kWh of energy storage.

22. An all-electric, battery powered mobile power unit, comprising:
a DC electrical energy source;
a power conversion system coupled to the DC electrical energy source, the power conversion system including a high voltage DC/DC converter and a plurality of inverter stages; and
an electronic controller configured to control operation of the power conversion system to produce a user-selected voltage output and a user-selected phase configuration selected from the group consisting of 480 VAC 3-phase, 208 VAC 3-phase, and 240 VAC single-phase;
wherein when the user-selected voltage output and phase configuration comprises 208 VAC 3-phase, the electronic controller is configured to:
control the high voltage DC/DC converter to operate as a pass-through, in which a primary battery voltage from the DC electrical energy source is provided as a secondary voltage; and
control the plurality of inverter stages to phase shift the outputs of the plurality of inverter stages to be 120 degrees apart.

23. The mobile power unit of claim 22, wherein the high voltage DC/DC converter is electrically coupled to the DC electrical energy source and the plurality of inverter stages is electrically coupled to the high voltage DC/DC converter.

24. The mobile power unit of claim 22, wherein when the user-selected voltage output and phase configuration comprises 208 VAC 3-phase, the primary battery voltage from the DC electrical energy source comprises 300-450 VDC and the secondary voltage also comprises 300-450 VDC.

25. The mobile power unit of claim 22, wherein when the user-selected voltage output and phase configuration comprises 208 VAC 3-phase:
a neutral line corresponding to a first output of a first of the plurality of inverter stages is in phase with a line L1 corresponding to a second output of a second of the plurality of inverter stages;
a line L2 corresponding to a third output of a third of the plurality of inverter stages is phase shifted by 120 degrees from the line L1; and
a line L3 corresponding to a fourth output of a fourth of the plurality of inverter stages is phase shifted by 120 degrees from the line L2.

26. The mobile power unit of claim 22, wherein the electronic controller is configured to provide the 208 VAC 3-phase output to only a subset of electrical connections on an interface panel of the mobile power unit.

27. The mobile power unit of claim 26, wherein the electronic controller is configured to provide the 208 VAC 3-phase output to only one or more tapered nose cam lock connectors, one or more threaded fastener style connectors, or one or more duplex connectors on the interface panel of the mobile power unit.

28. The mobile power unit of claim 27, wherein the electronic controller is configured to trigger circuit breakers associated with CS6365 connectors on the interface panel of the mobile power unit to prevent the 208 VAC 3-phase output from reaching the CS6365 connectors.

29. An all-electric, battery powered mobile power unit, comprising:
a DC electrical energy source;
a power conversion system coupled to the DC electrical energy source, the power conversion system including a high voltage DC/DC converter and a plurality of inverter stages; and
an electronic controller configured to control operation of the power conversion system to produce a user-selected voltage output and a user-selected phase configuration selected from the group consisting of 480 VAC 3-phase, 208 VAC 3-phase, and 240 VAC single-phase;
wherein when the user-selected voltage output and phase configuration comprises 240 VAC single-phase, the electronic controller is configured to:
control the high voltage DC/DC converter to operate as a pass-through, in which a primary battery voltage from the DC electrical energy source is provided as a secondary voltage; and
control the plurality of inverter stages to phase shift first and second outputs of the plurality of inverter stages to be 180 degrees apart.

30. The mobile power unit of claim 29, wherein the high voltage DC/DC converter is electrically coupled to the DC electrical energy source and the plurality of inverter stages is electrically coupled to the high voltage DC/DC converter.

31. The mobile power unit of claim 29, wherein the primary battery voltage from the DC electrical energy source comprises 300-450 VDC and the secondary voltage also comprises 300-450 VDC.

32. The mobile power unit of claim 29, wherein when the user-selected voltage output and phase configuration comprises 240 VAC single-phase:
a neutral line corresponding to a first output of a first of the plurality of inverter stages is in phase with a line L1 corresponding to a second output of a second of the plurality of inverter stages, and is in phase with a line L3 corresponding to a third output of a third of the plurality of inverter stages;

a line L2 corresponding to a fourth output of a fourth of the plurality of inverter stages is phase shifted by 180 degrees from the neutral line, the line L1, and the line L3.

33. The mobile power unit of claim 32, wherein the electronic controller is configured to provide the 240 VAC single-phase output to only a subset of electrical connections on an interface panel of the mobile power unit.

34. The mobile power unit of claim 33, wherein the electronic controller is configured to provide the 240 VAC single-phase output to only one or more duplex connectors or one or more CS6365 connectors on the interface panel of the mobile power unit.

35. The mobile power unit of claim 33, wherein the electronic controller is configured to trigger circuit breakers associated with tapered nose cam lock connectors or the threaded fastener style connectors on the interface panel of the mobile power unit to prevent the 240 VAC single-phase output from reaching the tapered nose cam lock connectors or the threaded fastener style connectors.

* * * * *